(12) United States Patent
Hongo et al.

(10) Patent No.: US 11,531,801 B2
(45) Date of Patent: Dec. 20, 2022

(54) INFORMATION PROCESSING DEVICE, INFORMATION PROCESSING METHOD, AND PROGRAM

(71) Applicant: SONY SEMICONDUCTOR SOLUTIONS CORPORATION, Kanagawa (JP)

(72) Inventors: Kazuhiro Hongo, Kanagawa (JP); Takaaki Hirano, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 490 days.

(21) Appl. No.: 16/619,123

(22) PCT Filed: May 30, 2018

(86) PCT No.: PCT/JP2018/020652
§ 371 (c)(1),
(2) Date: Dec. 4, 2019

(87) PCT Pub. No.: WO2018/230339
PCT Pub. Date: Dec. 20, 2018

(65) Prior Publication Data
US 2020/0117846 A1      Apr. 16, 2020

(30) Foreign Application Priority Data

Jun. 13, 2017    (JP) .............................. JP2017-115657

(51) Int. Cl.
*G06F 30/367* (2020.01)
*G01N 3/08* (2006.01)
*G01N 3/32* (2006.01)

(52) U.S. Cl.
CPC ............. *G06F 30/367* (2020.01); *G01N 3/08* (2013.01); *G01N 3/32* (2013.01);
(Continued)

(58) Field of Classification Search
CPC .... G01N 3/08; G01N 3/32; G01N 2203/0066; G01N 2203/0064; G01N 2203/0214;
(Continued)

(56) References Cited

U.S. PATENT DOCUMENTS 7,480,573 B2 *   1/2009  Toyosada ................. G01N 3/32
                                                       702/34
8,190,378 B2 *   5/2012  Sakai ....................... G01N 3/32
                                                       702/33
(Continued)

FOREIGN PATENT DOCUMENTS

JP    2009-160028 A    7/2009
JP    2011-204081 A    10/2011
(Continued)

OTHER PUBLICATIONS

International Search Report and Written Opinion of PCT Application No. PCT/JP2018/020652, dated Aug. 21, 2018, 06 pages of ISRWO.

*Primary Examiner* — Octavia Davis Hollington
(74) *Attorney, Agent, or Firm* — Chip Law Group

(57) ABSTRACT

The present disclosure relates to an information processing device, an information processing method, and a program for enabling more accurate prediction of a crack to be made. A model acquisition unit acquires a structure model $M_D$ from a model generation unit, an external device (not illustrated), or the like. Amplitude load energy A in an element E0 having no cracks is set on the basis of a relationship between an equivalent stress σ and an equivalent elastic strain ε experimentally obtained according to a material constituting the element E0. Since the equivalent elastic strain ε depends on a crack variable φ, the amplitude load energy A is expressed as a function of the crack variable φ. A crack prediction unit predicts a crack to be generated in a structure D by calculating a differential equation having a (Continued)

term proportional to the amplitude energy. The present disclosure can be applied to, for example, a crack prediction device that predicts a crack.

11 Claims, 13 Drawing Sheets

(52) U.S. Cl.
CPC ............... *G01N 2203/0066* (2013.01); *G01N 2203/0073* (2013.01); *G01N 2203/0214* (2013.01)

(58) Field of Classification Search
CPC .......... G01N 2203/0073; G06F 30/367; G06F 30/23; G01M 5/0033
USPC ........................................................ 702/108
See application file for complete search history.

(56) References Cited

U.S. PATENT DOCUMENTS

| | | | | |
|---|---|---|---|---|
| 2006/0097718 A1* | 5/2006 | Schlicker | ............. | G01N 27/023 324/228 |
| 2009/0048788 A1* | 2/2009 | Darehbidi | ................ | G01N 3/32 702/33 |
| 2011/0257901 A1* | 10/2011 | Bechhoefer | .............. | G01H 1/00 702/56 |
| 2012/0084019 A1* | 4/2012 | Khonsari | ................ | C22C 38/00 702/35 |
| 2012/0209538 A1* | 8/2012 | Caicedo | ................. | G01N 29/14 702/39 |
| 2015/0330950 A1* | 11/2015 | Bechhoefer | ............ | G01N 29/46 73/587 |
| 2017/0292401 A1* | 10/2017 | Sistaninia | ............. | F01D 21/003 |

FOREIGN PATENT DOCUMENTS

| | | | |
|---|---|---|---|
| KR | 20150087349 A | * | 7/2015 |
| WO | 2017/077668 A1 | | 5/2017 |

\* cited by examiner

INFORMATION PROCESSING DEVICE, INFORMATION PROCESSING METHOD, AND PROGRAM

CROSS REFERENCE TO RELATED APPLICATIONS

This application is a U.S. National Phase of International Patent Application No. PCT/JP2018/020652 filed on May 30, 2018, which claims priority benefit of Japanese Patent Application No. JP 2017-115657 filed in the Japan Patent Office on Jun. 13, 2017. Each of the above-referenced applications is hereby incorporated herein by reference in its entirety.

TECHNICAL FIELD

The present disclosure relates to an information processing device, an information processing method, and a program, and more particularly to an information processing device, an information processing method, and a program capable of more accurately predicting a crack.

BACKGROUND ART

Generally, various stresses such as mechanical stresses are applied to various structures of semiconductor devices and the like in manufacturing processes or the like. When such a stress is applied to a structure, a crack may occur in the structure. To prevent occurrence of such a crack, a technology of previously predicting a crack that may occur in a structure is used.

Patent Document 1 discloses a technology of setting, as a fracture load, a load of when a fracture mechanics parameter J integral value becomes equal to an elastoplastic fracture toughness value of a material of a tip of a crack, the fracture mechanics parameter J integral value being obtained using material constants of when a relationship between a stress and a strain of each of different types of materials is replaced with a relationship of a stress and a strain of a single material according to area ratios of the different types of materials on a cross section including the crack.

Patent Document 2 discloses a technology capable of predicting a crack straddling an interface of a plurality of types of materials. The technology according to Patent Document 2 calculates an energy release rate of when virtually causing a crack to progress inside a structure, and predicts that the crack progresses in a direction where the energy release rate is large.

CITATION LIST

Patent Document

Patent Document 1: Japanese Patent Application Laid-Open No. 2009-160028
Patent Document 2: Japanese Patent Application Laid-Open No. 2011-204081

SUMMARY OF THE INVENTION

Problems to be Solved by the Invention

In recent years, with the diversification of structures of semiconductor devices and the like, metal materials and resin materials are widely used as materials constituting the structures. Therefore, there is a demand for a technology of accurately predicting a crack that may occur in a structure formed using a metal material or a resin material.

With the technology according to Patent Document 1, it has been difficult to cope with a crack straddling an interface as well as to cope with a fatigue fracture. With the technology according to Patent Document 2, a calculation load is high and an analysis of a surface other than a predetermined specific surface has been difficult.

The present disclosure has been made in view of the foregoing, and enables more accurate prediction of a crack to be made.

Solutions to Problems

An information processing device according to an aspect of the present technology includes a model acquisition unit configured to acquire a structure model corresponding to a predetermined structure, and a crack prediction unit configured to predict a crack to be generated in the structure by calculating a differential equation including a term proportional to a time derivative of a crack variable set to each position of the structure model and expressing presence or absence of a crack, and a term proportional to amplitude load energy set to each position of the structure model and expressing energy applied during a repeated load using the crack variable.

The amplitude load energy is set by integrating a difference between a maximum value and a minimum value of a stress during the repeated load and a difference between a maximum value and a minimum value of a strain.

A constant regarding the amplitude load energy is set as a value according to a slope of a characteristic line of a high-cycle fatigue region in an S-N diagram of a corresponding material.

A constant regarding the amplitude load energy is set as a value according to a slope of a characteristic line of a high-cycle fatigue separation region in an S-N diagram of a corresponding material interface.

The crack prediction unit can divide an analysis section for each inflection point of stress time change with respect to a non-cyclic repeated load, and can predict the crack to be generated in the structure for each divided analysis section.

The crack prediction unit can predict the crack to be generated in the structure by calculating the differential equation further including a term proportional to plastic dissipation energy set to each position of the structure model and expressing energy dissipated during plastic deformation using the crack variable.

The plastic dissipation energy is set using an amount obtained by integrating an equivalent stress by a minute increment of an equivalent plastic strain.

The plastic dissipation energy is set using a product of an equivalent plastic strain and a difference between an equivalent stress and a yield stress, and is set as zero in a case where the equivalent stress is smaller than the yield stress.

The differential equation can further include a diffusion term proportional to a second derivative of a spatial coordinate.

An information processing method according to an aspect of the present technology acquires a structure model corresponding to a predetermined structure, and predicts a crack to be generated in the structure by calculating a differential equation including a term proportional to a time derivative of a crack variable set to each position of the structure model and expressing presence or absence of a crack, and a term proportional to amplitude load energy set to each position of the structure model and expressing energy applied during a repeated load using the crack variable.

A program according to an aspect of the present technology causes a computer to function as a model acquisition unit configured to acquire a structure model corresponding to a predetermined structure, and a crack prediction unit configured to predict a crack to be generated in the structure by calculating a differential equation including a term proportional to a time derivative of a crack variable set to each position of the structure model and expressing presence or absence of a crack, and a term proportional to amplitude load energy set to each position of the structure model and expressing energy applied during a repeated load using the crack variable.

In an aspect of the present technology, the structure model corresponding to a predetermined structure is acquired. Then, the crack to be generated in the structure is predicted by calculating a differential equation including a term proportional to a time derivative of a crack variable set to each position of the structure model and expressing presence or absence of a crack, and a term proportional to amplitude load energy set to each position of the structure model and expressing energy applied at time of repeated load using the crack variable.

Effects of the Invention

According to the present technology, a high-cycle fatigue fracture can be predicted. As a result, a crack can be more accurately predicted.

Note that effects described in the present specification are merely examples, and effects of the present technology are not limited to the effects described in the specification, and there may be additional effects.

MODE FOR CARRYING OUT THE INVENTION

Figure 1:
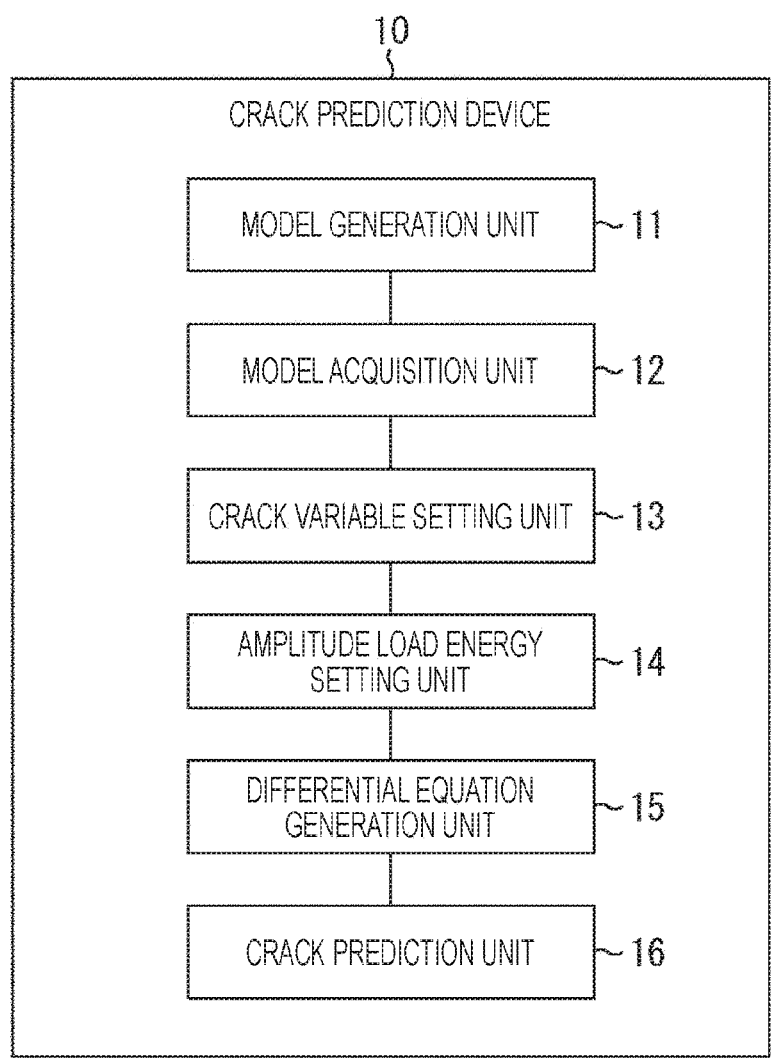
FIG. 1 is a block diagram showing a configuration example of a crack prediction device (information processing device) according to an embodiment of the present technology.

Hereinafter, a mode for implementing the present disclosure (hereinafter referred to as embodiment) will be described. Note that the description will be given in the following order. Furthermore, in the drawings, an X axis, a Y axis, and a Z axis orthogonal to one another are illustrated as appropriate. The X axis, Y axis, and Z axis are common in all the drawings.

0. Overview
1. First Embodiment
2. Second Embodiment
3. Computer

0. Overview

Overview of Crack Prediction Method

An overview of a crack prediction method (information processing method) according to the present technology will be described. In the crack prediction method according to the present technology, a crack to be generated in a structure D is predicted by applying the concept of the phase field method. First, a crack prediction method according to the concept of the phase field method related to the present technology will be described.

Crack Prediction Method According to Concept of Phase Field Method

Energy F in the structure D is expressed by the equation (1) using barrier energy $f_{doub}$, gradient energy $f_{grad}$, and elastic energy $f_{elast}$.

[Math. 1]

$$F = \int_V f \, dV = \int_V (f_{doub} + f_{grad} + f_{elast}) \, dV \tag{1}$$

According to the concept of the phase field method, the next differential equation (2) can be derived from the equation (1).

[Math. 2]

$$\frac{1}{M}\frac{\partial \phi}{\partial t} = \nabla(\xi \nabla \phi) - \left(\frac{\partial f_{doub}}{\partial \phi} + \frac{\partial f_{elast}}{\partial \phi}\right) \tag{2}$$

The left side of the differential equation (2) includes a product of a reciprocal of mobility M and a time derivative of a crack variable φ expressing presence or absence of a crack. The right side of the differential equation (2) includes a diffusion term $\nabla(\xi \nabla \phi)$ of a second derivative of spatial coordinates, a derivative term of the barrier energy $f_{doub}$, and a derivative term of the elastic energy $f_{elast}$. In the differential equation (2), a release rate of the elastic energy $f_{elast}$ is expressed by the derivative term of the elastic energy $f_{elast}$.

To calculate the differential equation (2), the crack variable $\varphi$ is first set at each position of the structure D. More specifically, different crack variables $\varphi$ are set for a position having no cracks and a position having a crack. For example, the crack variable $\varphi$ at the position having no cracks is set to "0", and the crack variable $\varphi$ at the position having a crack is set to "1".

Then, when the calculation of the differential equation (2) proceeds, a position where the crack variable $\varphi$ is "1" or more appears, over time, among the positions where the crack variable $\varphi$ has been set to "0". The crack prediction method according to the concept of the phase field method is capable of predicting that a crack has occurred at the position where the crack variable $\varphi$ is "1" or more after the elapse of a predetermined time.

The crack prediction method according to the concept of the phase field method is capable of promptly predicting a crack by calculating the differential equation (2). Furthermore, the crack prediction method according to the concept of the phase field method is capable of predicting a crack straddling an interface of a plurality of types of materials, and thus is capable of predicting a crack to be generated in the structure D configured using a plurality of materials. Moreover, since the crack prediction method according to the concept of the phase field method has no restriction on the shape of the crack, high versatility can be obtained.

The crack prediction method according to the concept of the phase field method is capable of predicting a crack due to brittle fracture using the release rate of the elastic energy included in the differential equation (2). However, the crack prediction method according to the concept of the phase field method is not capable of predicting a crack due to a fatigue fracture with plastic deformation because a term corresponding to plastic deformation is not included in the differential equation (2).

Therefore, the crack prediction method using the concept of the phase field method is difficult to accurately predict a crack to be generated in the structure D configured using a material that is easily subject to a fatigue fracture, such as a metal material or a resin material.

Therefore, the inventor of the present technology has applied the concept of the phase field method and has found that a crack due to a fatigue fracture is predictable by introducing a term including energy mainly dissipating as heat during plastic deformation (hereinafter the energy is referred to as "plastic dissipation energy $f_{plast}$") into the differential equation (2). Hereinafter, a crack prediction method applying the concept of the phase field method according to the present technology will be described.

Crack Prediction Method Applying Concept of Phase Field Method

The crack prediction method applying the concept of the phase field method according to the present technology uses the next differential equation (3) obtained by introducing the term of the plastic dissipation energy $f_{plast}$ into the differential equation (2).

[Math. 3]

$$\frac{1}{M}\frac{\partial \phi}{\partial t} = \nabla(\xi\nabla\phi) - \left(\frac{\partial f_{doub}}{\partial \phi} + \frac{\partial f_{elast}}{\partial \phi} + f_{plast}\right) \quad (3)$$

In the differential equation (3), the plastic dissipation energy $f_{plast}$ is not a derivative term unlike the elastic energy $f_{elast}$. This is because the elastic energy $f_{elast}$ is released over time while the plastic dissipation energy $f_{plast}$ is accumulated over time. In the differential equation (3), accumulation of the plastic dissipation energy $f_{plast}$ can be expressed by not using the plastic dissipation energy $f_{plast}$ as a derivative term.

Thus, the differential equation (3) includes the derivative term of the elastic energy $f_{elast}$ that expresses the release rate of the elastic energy $f_{elast}$ and the term of the plastic dissipation energy $f_{plast}$ that expresses the accumulation of the plastic dissipation energy $f_{plast}$. Therefore, by calculating the differential equation (3), a crack can be predicted in consideration of both the brittle fracture and the fatigue fracture.

Note that a low-cycle fatigue (plastic fatigue), of the fatigue fractures, can be analyzed with the above-described plastic dissipation energy $f_{plast}$. However, it has been difficult to cope with a high-cycle fatigue (elastic fatigue) analysis.

Therefore, the inventor of the present technology has further applied the concept of the phase field method and has found that a crack due to a high-cycle fatigue (elastic fatigue) is predictable by introducing a term including energy representing a high-cycle repeated fatigue (load) (hereinafter the energy is referred to as amplitude load energy A) into the differential equation (2).

Crack Prediction Method Applying Concept of Phase Field Method

The crack prediction method applying the concept of the phase field method according to the present technology uses the next differential equation (4) obtained by introducing the term of the amplitude load energy A into the differential equation (2).

[Math. 4]

$$\frac{1}{M}\frac{\partial \phi}{\partial t} = \nabla(\xi\nabla\phi) - \left(\frac{\partial f_{doub}}{\partial \phi} + \frac{\partial f_{elast}}{\partial \phi} + A\right) \quad (4)$$

The differential equation (4) is an equation obtained by replacing the plastic dissipation energy $f_{plast}$ with the amplitude load energy A in the differential equation (3). In other words, the differential equation (4) is obtained by adding the term of the amplitude load energy A for performing a high-cycle fatigue analysis corresponding to a repeated load to the differential equation (2).

In the differential equation (4), the amplitude load energy A is not a derivative term unlike the elastic energy $f_{elast}$. This is because the elastic energy $f_{elast}$ is released over time while the amplitude load energy A is accumulated over time. In the differential equation (4), the accumulation of the amplitude load energy A can be expressed by not using the amplitude load energy A as a derivative term.

Thus, the differential equation (4) includes the derivative term of the elastic energy $f_{elast}$ that expresses the release rate of the elastic energy $f_{elast}$ and the term of the amplitude load energy A that expresses the accumulation of the amplitude load energy A. Therefore, by calculating the differential equation (4), a crack can be predicted in consideration of both the brittle fracture and the high-cycle fatigue fracture.

For this reason, in the present technology, a crack to be generated in the structure D configured using a material that is easily subject to a high-cycle fatigue (elastic fatigue), of the fatigue fractures of the metal materials, the resin materials, and the like, can be accurately predicted. Furthermore, the crack prediction method according to the present technology is also capable of predicting a crack straddling an interface of a plurality of types of materials, similarly to the crack prediction method according to the concept of the phase field method. Therefore, the crack prediction method according to the present technology is capable of promptly predicting a crack to be generated in the structure D configured using a plurality of materials. Moreover, the crack prediction method according to the present technology has no restriction on the shape of the crack, similarly to the crack prediction method according to the concept of the phase field method. Therefore, high versatility can be obtained.

1. First Embodiment

Details of Crack Prediction Device

FIG. 1 is a block diagram showing a configuration example of a crack prediction device (information processing device) 10 according to a first embodiment of the present technology. Note that, in the first embodiment, an elastic fatigue (high-cycle fatigue) among fatigue fractures will be described.

The crack prediction device 10 includes a model generation unit 11, a model acquisition unit 12, a crack variable setting unit 13, an amplitude load energy setting unit 14, a differential equation generation unit 15, and a crack prediction unit 16.

The model generation unit 11 generates a model (structure model) $M_D$ that reproduces a configuration of the structure D. The model acquisition unit 12 acquires the structure model $M_D$ generated by the model generation unit 11.

The crack variable setting unit 13 sets a crack variable $\varphi$ expressing the presence or absence of a crack in each element E of the structure model $M_D$ acquired by the model acquisition unit 12. The amplitude load energy setting unit 14 sets amplitude load energy A to each element E of the structure model $M_D$ acquired by the model acquisition unit 12.

The differential equation generation unit 15 creates a differential equation using the crack variable $\varphi$ set by the crack variable setting unit 13 and the amplitude load energy A set by the amplitude load energy setting unit 14.

The crack prediction unit 16 predicts a crack to be generated in the structure D by calculating the differential equation generated by the differential equation generation unit 15.

Example of Crack Prediction Operation

Figure 2:
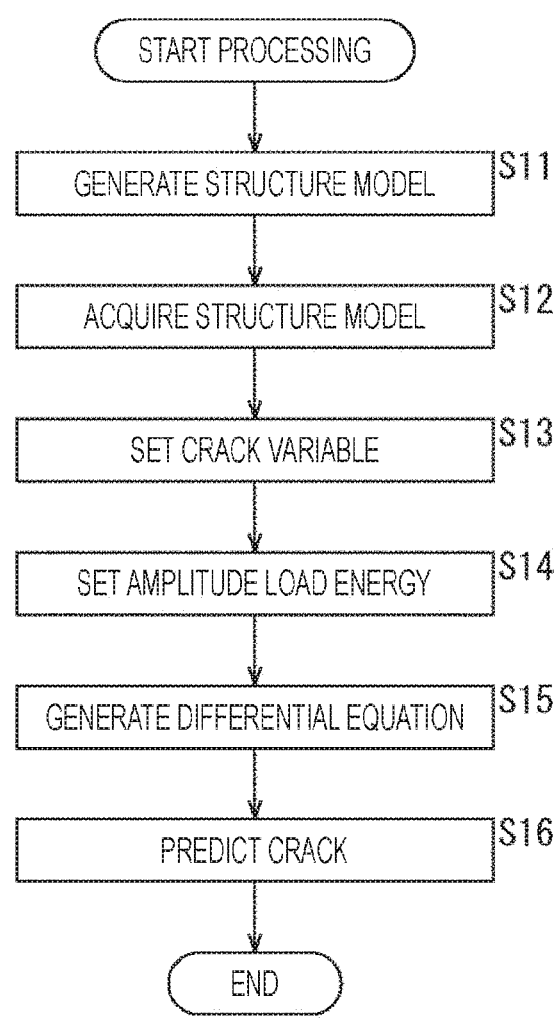
FIG. 2 is a flowchart illustrating crack prediction processing of the crack prediction device in FIG. 1.

FIG. 2 is a flowchart illustrating crack prediction processing of the crack prediction device 10. FIGS. 3A, 3B, 4, 5, 6, 7, 8, 9, 10, 11, 12, and 13 are views and diagrams for illustrating steps shown in FIG. 2. Hereinafter, the crack prediction processing according to the first embodiment will be described with reference to FIGS. 3A, 3B, 4, 5, 6, 7, 8, 9, 10, 11, 12, and 13 along FIG. 2.

Model Generation Step

In step S11, the model generation unit 11 generates the model (structure model) $M_D$ that reproduces a configuration of the structure D. The configuration of an arbitrary structure D can be reproduced by the structure model $M_D$. Examples of the structure D, the configuration of which can be reproduced by the structure model $M_D$, include various devices such as semiconductor devices.

As a crack prediction method, a finite element method (FEM) or a finite difference method (FDM) can be used. Furthermore, an implicit method or an explicit method can be used. The finite element method is capable of coping with an arbitrary shape, and high versatility can be obtained. The finite difference method is capable of easily parallelizing calculation, and an advantage of quick calculation can be obtained. The implicit method has an advantage of taking a large time step. In the present embodiment, the finite element method is used, and thus the structure model $M_D$ is configured by a plurality of elements E.

Figure 3A:
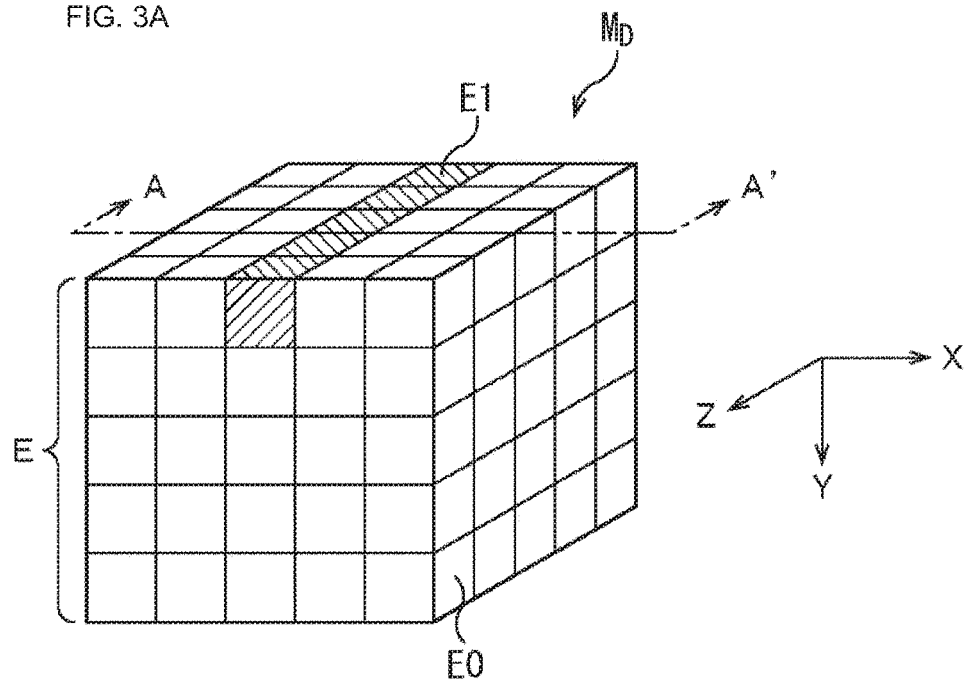
FIGS. 3A and 3B are views showing an example of a structure model generated in the crack prediction processing.
Figure 3B:
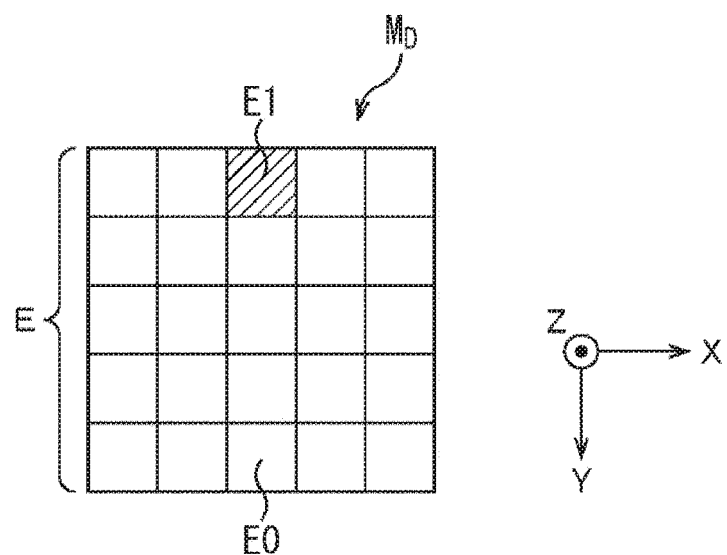

FIGS. 3A and 3B are diagrams illustrating the structure model $M_D$ generated in step S11. FIG. 3A is a perspective view of the structure model $M_D$, and FIG. 3B is a cross-sectional view of the structure model $M_D$ along line A-A' in FIG. 3A. In the structure D, the configuration of which has been reproduced by the structure model $M_D$ illustrated in FIGS. 3A and 3B, a general form is a cube, and an initial crack extending in a Z-axis direction is formed in a center of an upper surface.

In this case, in the structure model $M_D$, five elements E arranged in the Z-axis direction in a central portion in an X-axis direction on the upper surface in a Y-axis direction are elements E1 having the crack, and the other elements E are elements E0 having no cracks. In FIGS. 3A and 3B the element E1 having a crack is hatched and the element E0 having no crack is outlined. Note that the element E having a free space such as a hole is favorably handled in a similar manner to the element E1 having a crack.

The description below will be given using the structure model $M_D$ shown in FIGS. 3A and 3B as an example. However, it is needless to say that other structure models $M_D$ can also be similarly handled.

Note that step S11 may be omitted, for example, in a case where the structure model $M_D$ is prepared in advance.

Model Acquisition Step

In step S12, the model acquisition unit 12 acquires the structure model $M_D$ generated in step S11. Note that, in a case where step S11 is not performed, the structure model $M_D$ can be acquired from an external device (not illustrated) or the like in step S12.

Crack Variable Setting Step

In step S13, the crack variable setting unit 13 sets the crack variable $\varphi$ expressing the presence or absence of a crack in each element E of the structure model $M_D$ acquired in step S12.

Specifically, in the structure model $M_D$, different crack variables $\varphi$ are set for the element E0 having no cracks and the element E1 having a crack. That is, the crack variable $\varphi$ of the element E0 having no cracks is set to "m", and the crack variable $\varphi$ of the element E1 having a crack is set to "n" that is different from "m". Either "m" or "n" can be large. As an example, the crack variable $\varphi$ of the element E0 having no cracks is set to "0", and the crack variable φ of the element E1 having a crack is set to "1".

Note that step S13 may be omitted, for example, in a case where the crack variable φ is set in advance in the structure model $M_D$.

Amplitude Load Energy Setting Step

In step S14, the amplitude load energy setting unit 14 sets the amplitude load energy A for each element E of the structure model $M_D$ acquired in step S12. Note that, in the element E1 already having a crack, an elastic response does not occur, and therefore the amplitude load energy A is not accumulated. For this reason, the amplitude load energy A of the element E1 is set to "0".

Amplitude load energy A in an element E0 having no cracks is set on the basis of a relationship between an equivalent stress σ and an equivalent elastic strain ε experimentally obtained according to a material constituting the element E0. Since the equivalent elastic strain ε depends on a crack variable φ, the amplitude load energy A is expressed as a function of the crack variable φ.

Note that step S14 may be omitted, for example, in a case where the amplitude load energy A is set in advance in the structure model $M_D$.

Differential Equation Generation Step

In step S15, the differential equation generation unit 15 creates a differential equation using the crack variable φ set in step S13 and the amplitude load energy A set in step S14.

An example of the differential equation generated in step S15 includes the above-described differential equation (4). Furthermore, in step S15, the following differential equation (5) may be generated, which is an improvement of the differential equation (4). Note that the equation (5) is also a diffusion equation.

[Math. 5]

$$\frac{1}{M}\frac{\partial \phi}{\partial t} = \nabla \cdot (\xi \nabla \phi) - \left( w_{doub} \frac{\partial f_{doub}}{\partial \phi} + w_{elast} \frac{\partial f_{elast}}{\partial \phi} + w_{hc} A \right) \quad (5)$$

In the differential equation (5), a fitting constant $w_{doub}$ for the derivative term of the barrier energy $f_{doub}$, a fitting constant $w_{elast}$ for the derivative term of the elastic energy $f_{elast}$, and a fitting constant $w_{hc}$ for the term of the amplitude load energy A are introduced. Thereby, weighting of the derivative term of the barrier energy $f_{doub}$, the derivative term of the elastic energy $f_{elast}$ and the term of the amplitude load energy A can be optimized according to the configuration of the structure D, and the like. Thereby, a crack to be generated in the structure D can be further accurately predicted.

Figure 4:
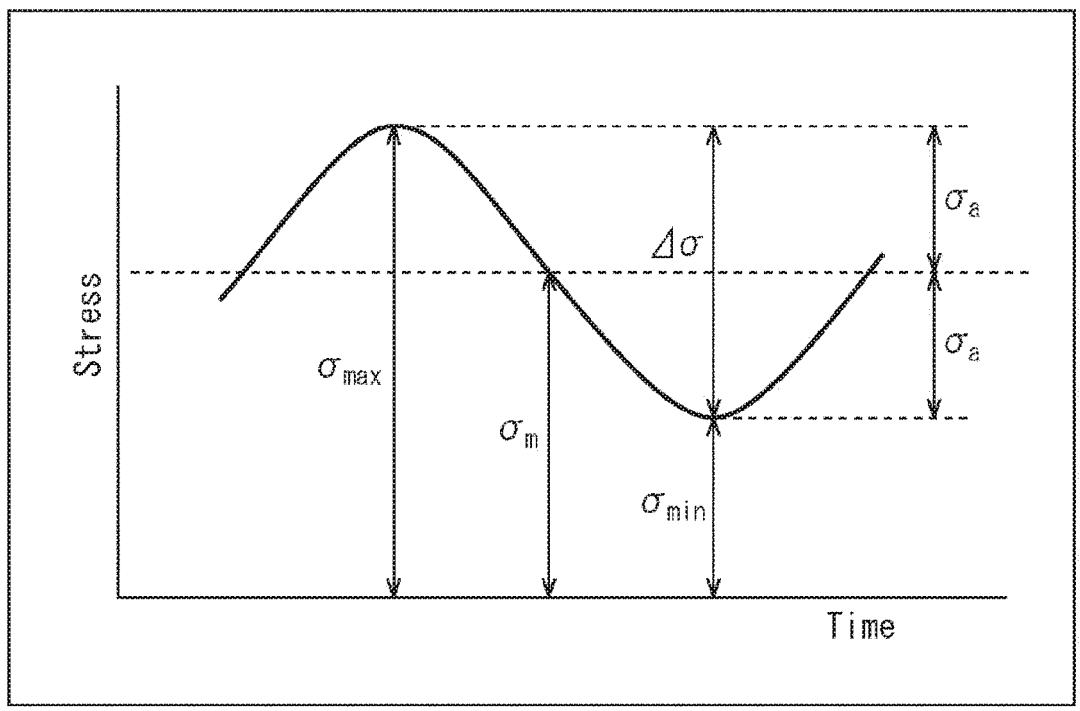
FIG. 4 is a diagram for defining stress amplitude regarding an object material corresponding to a repeated load.

Note that the amplitude load energy A in the equation (5) is energy corresponding to a load of when stress amplitude Δσ applied to an object material corresponding to a repeated load is defined as the stress amplitude Δσ=maximum stress $σ_{max}$—the minimum stress $σ_{min}$ in the graph in FIG. 4. The amplitude load energy A is expressed by the following equation (6).

[Math. 6]

$$A = \frac{1}{2}\Delta\sigma \cdot \Delta\varepsilon = \frac{1}{2}(\sigma_{max} - \sigma_{min}) \cdot (\varepsilon_{max} - \varepsilon_{min}) \quad (6)$$

Here, Δε is strain amplitude, and is the maximum strain $ε_{max}$—the minimum strain $ε_{min}$. Note that this strain is an elastic strain.

Furthermore, who regarding the amplitude load energy A in the equation (5) will be described with reference to FIG. 5.

Figure 5:
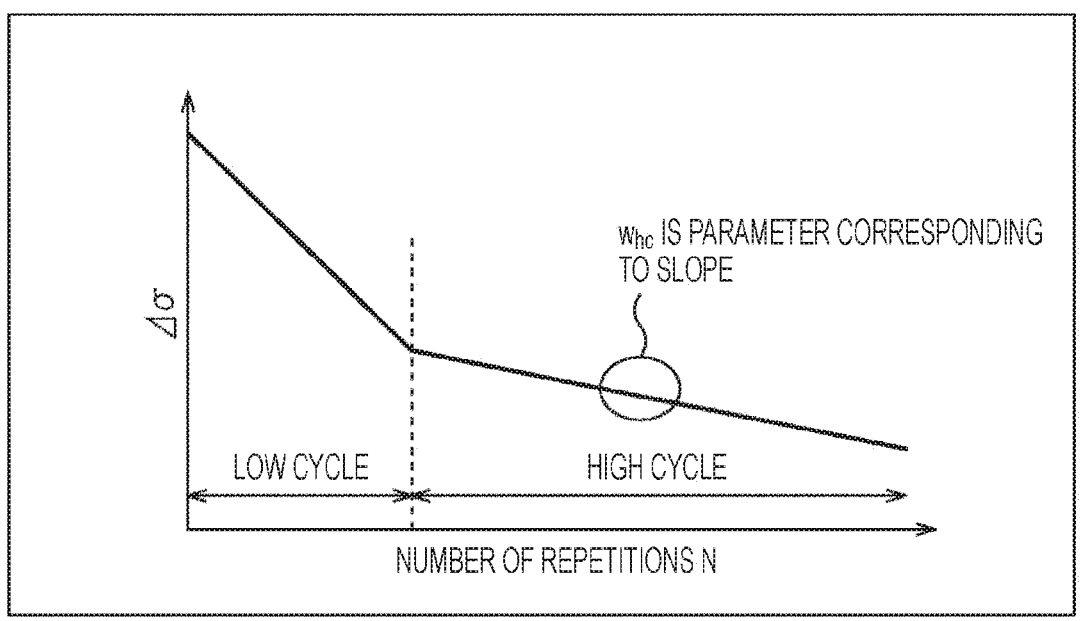
FIG. 5 is a diagram illustrating an S-N diagram of the object material.

FIG. 5 illustrates an S-N diagram of the object material. The S-N diagram is a graph illustrating fatigue test results with the vertical axis representing the stress amplitude Δσ and the horizontal axis representing the number of repetitions N until fracture. In practice, the S-N diagram is divided into a low-cycle fatigue (plastic fatigue) region and a high-cycle fatigue (elastic fatigue) region having different mechanisms on the basis of the number of repetitions N. $w_{hc}$ is a parameter corresponding to a slope of the high-cycle fatigue region, and is a parameter that determines a progress speed of a crack in analysis.

Figure 6:
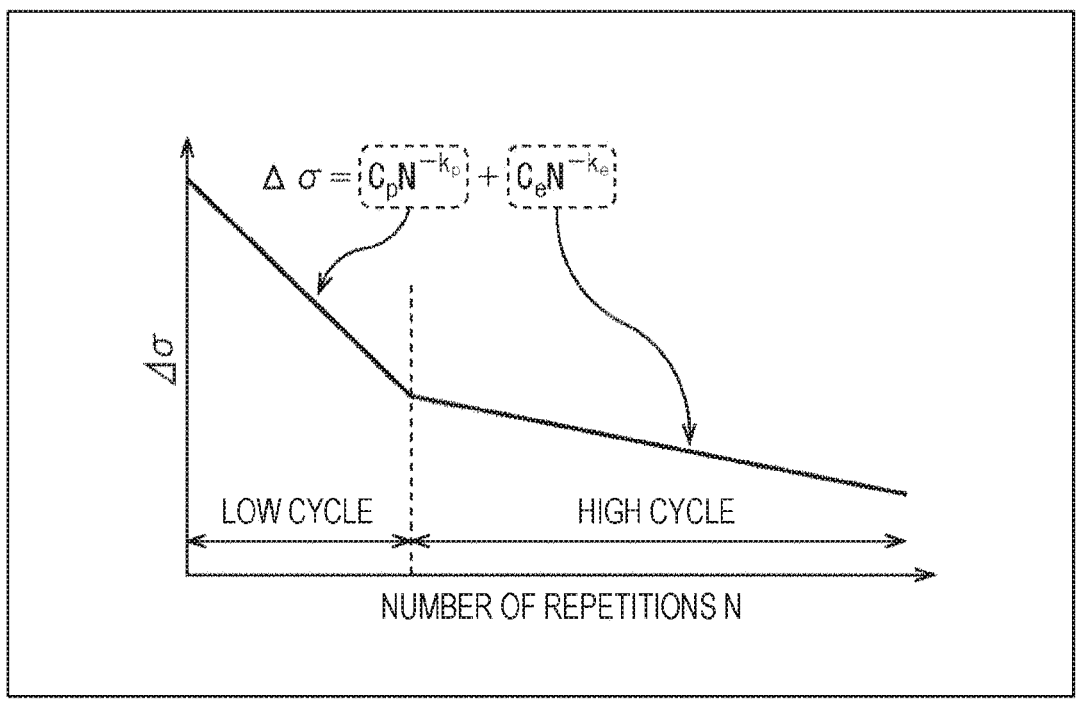
FIG. 6 is a diagram illustrating an equation used when describing low-cycle and high-cycle fatigue characteristics of a material.

Note that, in describing the low-cycle and high-cycle fatigue characteristics of the material, fitting is often performed by the following equation (7) that is a mathematical expression shown in FIG. 6.

[Math. 7]

$$\Delta\sigma = C_p N^{-k_p} + C_e N^{-k_e} \quad (7)$$

The first term on the right side of the equation (7) represents the stress amplitude in the low-cycle fatigue region, and the second term represents the stress amplitude in the high-cycle fatigue region. At this time, $w_{hc}$ is expressed by the following equation (8) using a function f.

[Math. 8]

$$w_{hc} = f(k_e) \quad (8)$$

Note that, here, the function f may be linear or non-linear.

In a case where different types of materials are bonded by physical bonding, chemical bonding, adhesive bonding, electrostatic bonding, or the like, and bonding force life is smaller than a bonding force in the bulk of each material, interface separation progresses when the repeated load is applied to a bonded part. As characteristics at that time, a characteristic diagram can also be obtained for a fatigue fracture at the interface, as shown in FIGS. 5 and 6.

By defining $w_{hcx}$ corresponding to an interface of an analysis model, a progress of separation in a high cycle can be analyzed.

Moreover, a case where the load assumed for the object is not a cyclic vibration load (that is, a non-cyclic load) will be described with reference to FIG. 7.

Figure 7:
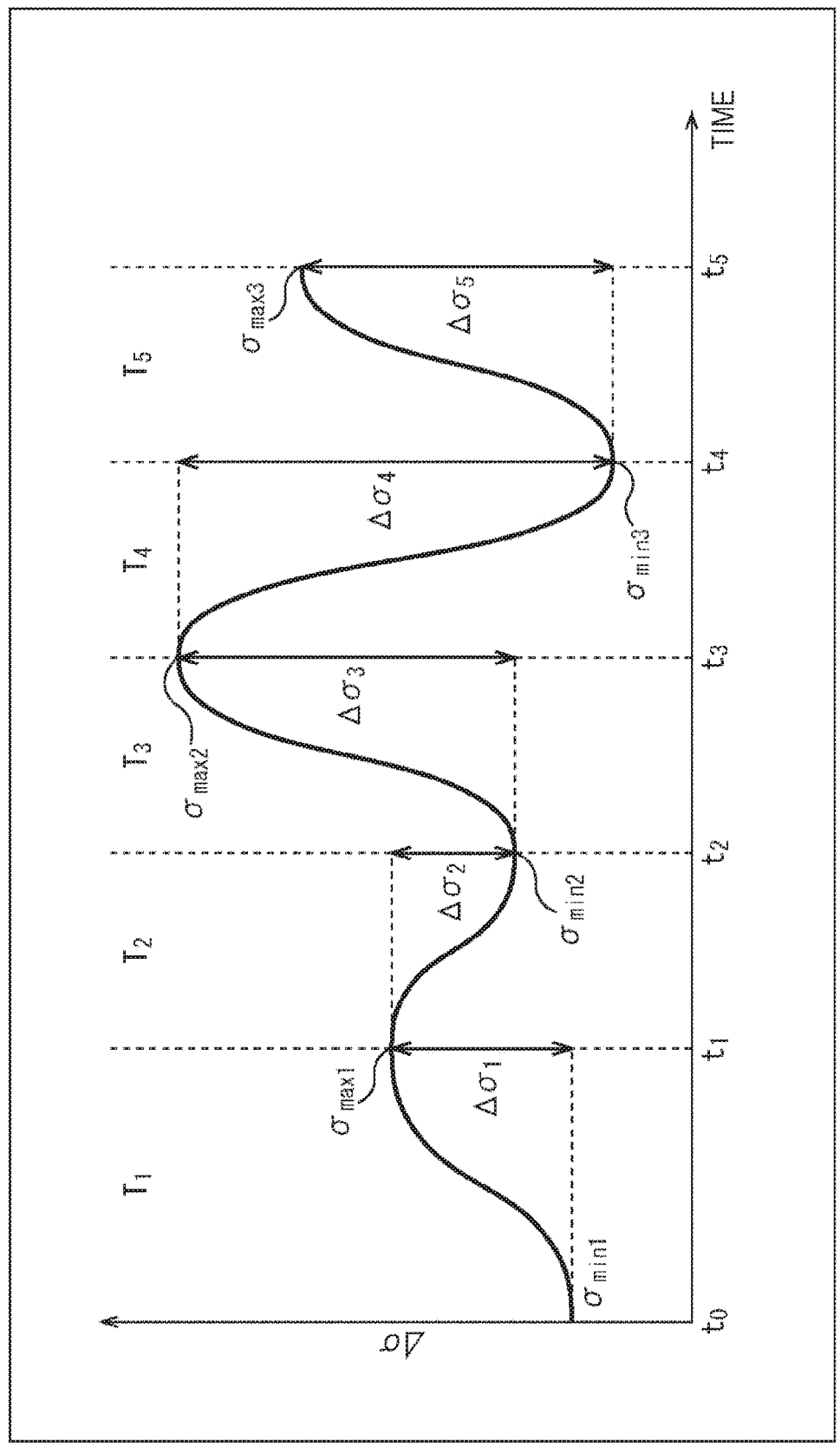
FIG. 7 is a diagram illustrating an example of a case where a load assumed for an object is not a cyclic vibration load.

As an example of the non-cyclic load, consider a case where a time history of stresses applied to an object is as shown in FIG. 7. In the example in FIG. 7, the stress amplitude varies depending on time, and a time interval between amplitude peaks also varies.

In such a case, the analysis method is a method of analyzing a crack progress along a time axis, so the time axis is divided for each inflection point of stresses, the time of each inflection point is set as a section, an analysis is performed using the differential equation on the basis of the stress amplitude Δσ of the section, and the crack progress id determined. After determining the crack progress of one section, the processing proceeds by a procedure of performing an analysis using the differential equation on the basis of the stress amplitude Δσ of the next section, and of determining the crack progress.

For example, as shown in FIG. 7, $σ_{min1}$, $σ_{max1}$, $σ_{min2}$, $σ_{max2}$, $σ_{min3}$, and $σ_{max3}$ are inflection points of stresses, and are stresses at times $t_0$, $t_1$, $t_2$, $t_3$, $t_4$, and $t_5$, respectively. In the section (time) $T_1$ ($t_0$ to $t_1$) of the amplitude of $\sigma_{min1}$ to $\sigma_{max1}$, an analysis is performed using the differential equation on the basis of $\Delta\sigma 1 = \sigma_{max1} - \sigma_{min1}$. Next, in the section $T_2$ ($t_1$ to $t_2$) of the amplitude of $\sigma_{max1}$ to $\sigma_{min2}$, an analysis is performed using the differential equation on the basis of $\Delta\sigma 2 = \sigma_{max1} - \sigma_{min2}$. In the section (time) $T_3$ ($t_2$ to $t_3$) of the amplitude of $\sigma_{min2}$ to $\sigma_{max2}$, an analysis is performed using the differential equation on the basis of $\Delta\sigma 3 = \sigma_{max2} - \sigma_{min2}$. Next, in the section (time) $T_4$ ($t_3$ to $t_4$) of the amplitude of $\sigma_{max2}$ to $\sigma_{min3}$ an analysis is performed using the differential equation on the basis of $\Delta\sigma 4 = \sigma_{max2} - \sigma_{min\ 3}$. In the section (time) $T_5$ ($t_4$ to $t_5$) of the amplitude of $\sigma_{min3}$ to $\sigma_{max3}$, an analysis is performed using the differential equation on the basis of $\Delta\sigma 5 = \sigma_{max3} - \sigma_{min3}$.

As described above, the time axis is divided for each inflection point, and the analysis is performed using the differential equation on the basis of $\Delta\sigma$ of the section. Therefore, a crack can be predicted corresponding to any load waveform.

Note that step S15 may be omitted, for example, in a case where a differential equation is generated in advance.

Crack Prediction Step

In step S16, the crack prediction unit 16 predicts a crack to be generated in the structure D by calculating the differential equation generated in step S15. Note that, in a case where step S15 is not performed, a crack to be generated in the structure D is predicted by calculating the differential equation acquired from an external device or the like in step S16.

Figure 8:
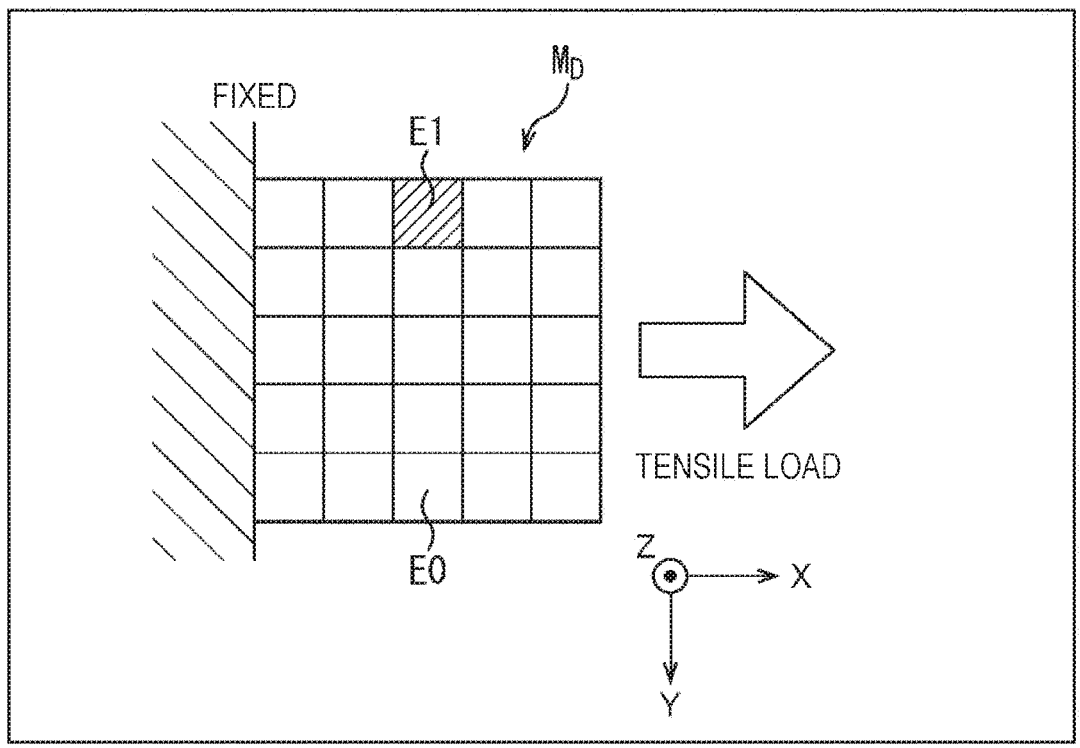
FIG. 8 is a diagram for illustrating an example of a load condition to be applied to the structure model.

When the differential equation is calculated, a load condition is applied to the structure model $M_D$ for first reproducing a stress to be applied to the structure D, and a stress analysis is performed. FIG. 8 shows an example of the load condition applied to the structure model $M_D$. In the example shown in FIG. 8, a tensile load is applied to a right-side surface in the X-axis direction in a state where a left-side surface in the X-axis direction is fixed (restrained) in the structure model $M_D$. Then, by calculating the differential equation under this load condition, change in the crack variable $\varphi$ in each element E0 with the passage of time can be obtained.

Figure 9:
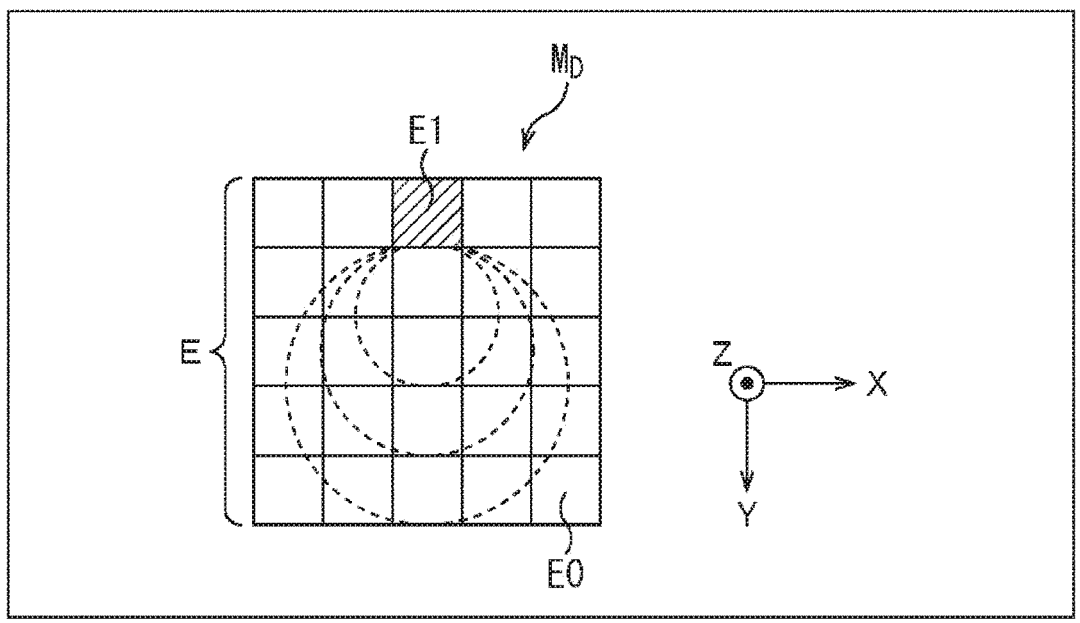
FIG. 9 is a diagram showing an example of distribution of amplitude load energy in the structure model.

FIG. 9 shows distribution of the amplitude load energy A at certain time in a case where the load condition is applied to the structure model $M_D$ as shown in FIG. 8. In FIG. 9, an equal energy surface having the same amplitude load energy A is shown as a broken line. In the structure model $M_D$, the equal energy surface spreads in an arc shape, and the amplitude load energy A is larger as an element is closer to a lower surface in the Y-axis direction of the element E1 that is a tip of a crack.

Figure 10:
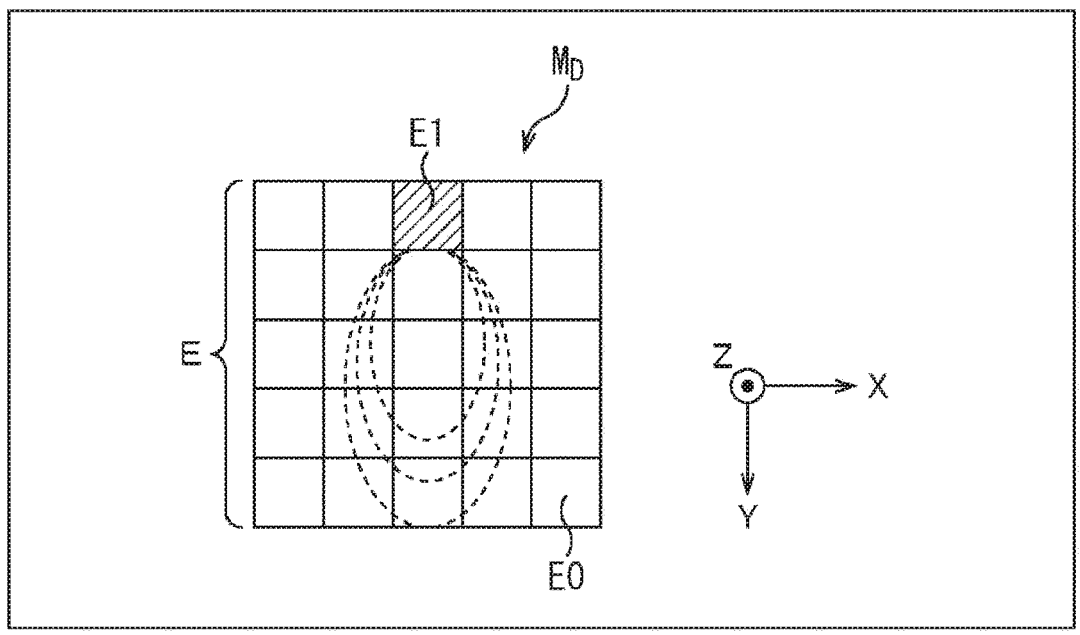
FIG. 10 is a diagram showing an example of distribution of crack variables in the structure model.

FIG. 10 shows distribution of the crack variables $\varphi$ at certain time in a case where the load condition is applied to the structure model $M_D$ as shown in FIG. 8. In FIG. 10, an equal crack variable surface having the same crack variable $\varphi$ is shown as a broken line. In the structure model $M_D$, the equal crack variable surface spreads in an elliptical arc shape extending downward in the Y-axis direction from a lower surface in the Y-axis direction of the element E1 that is a tip of a crack. The crack variable $\varphi$ is larger toward an inner equal crack variable surface.

Figure 11:
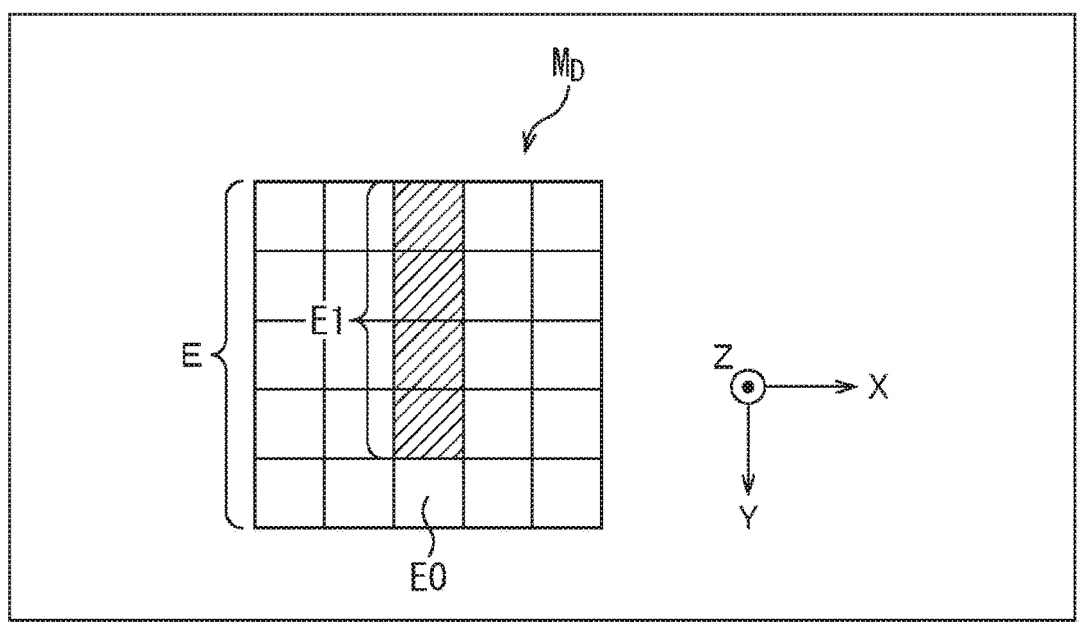
FIG. 11 is a diagram showing an example of a crack predicted in the structure model.

In step S16, occurrence of a crack is predicted in the element E0 having the crack variable $\varphi$ of "1" after the elapse of a predetermined time. For example, in a case where the crack variable $\varphi$ of the three elements E0 on the lower side in the Y-axis direction of the element E1 is "1" or more, occurrence of a crack is predicted in the three elements E0, and these three elements E0 are changed to elements E1, as shown in FIG. 11.

Furthermore, in the process of calculating the differential equation, it is favorable to sequentially change the amplitude load energy A of the element E0 with the crack variable $\varphi$ that becomes "1" or more to "0". As a result, the differential equation can be calculated while sequentially updating the crack in the structure model $M_D$, so that the crack can be more accurately predicted.

By calculating the differential equation in step S16, as described above, the distribution of the elements E1 having a crack in the structure model $M_D$ after the elapse of a predetermined time can be obtained. Then, a crack to be generated in the structure D can be predicted by the distribution of the elements E1 having a crack in the structure model $M_D$.

Modification of Differential Equation

The differential equations generated in step S15 are not limited to the differential equations (4) and (5) generated on the basis of the concept of the phase field method, and can be changed as appropriate. Hereinafter, modifications of the differential equations that can be used in the present technology will be described.

1. Customization According to the Material Forming the Structure D

The differential equations (4) and (5) generated on the basis of the concept of the phase field method include the diffusion term proportional to the second derivative of spatial coordinates and the derivative term of the elastic energy $f_{elast}$ and thus can be applied to the structure D formed using various materials. That is, high versatility is obtained in the differential equations (4) and (5).

Meanwhile, unnecessary terms are included in the differential equations (4) and (5), depending on a material forming the structure D. Therefore, in step S15, by customizing the differential equation to eliminate the unnecessary terms according to the material forming the structure D, for example, a crack to be generated in the structure D can be promptly and accurately predicted.

The crack prediction method according to the present technology is only required to be able to predict a crack in the structure D configured using a material easily subject to a high-cycle fatigue fracture, such as a metal material or a resin material. Therefore, the differential equation generated in the step S15 is only required to include at least a term proportional to the time derivative of the crack variable $\varphi$ and a term proportional to the amplitude load energy A set in step S14.

Furthermore, the crack prediction device 10 in FIG. 1 is only required to include at least the model acquisition unit 12 and the crack prediction unit 16. That is, in a case where steps S11, and S13 to S15 are not executed, the crack prediction device 10 does not need to include the model generation unit 11, the crack variable setting unit 13, the amplitude load energy setting unit 14, and the differential equation generation unit 15. Furthermore, the crack prediction device 10 may include a configuration other than the above configuration as necessary.

Hereinafter, an example of a material forming the structure D will be given, and a differential equation customized according to the material will be exemplified. Note that the material for forming the structure D is not limited to the following materials, and may be any material. Furthermore, differential equations corresponding to the respective materials are not limited to those exemplified below, and can be arbitrarily customized.

(a) Material Less Easily Subject to Brittle Fracture

In a case where the material forming the structure D is less easily subject to brittle fracture, the next differential equation (9) excluding terms other than the term of the amplitude load energy A and considering only the high-cycle fatigue fracture can be used, for example.

[Math. 9]

$$\frac{\partial \phi}{\partial t} = -A \qquad (9)$$

The differential equation (9) includes only the term of the time derivative of the crack variable $\varphi$ and the term of the amplitude load energy A. Note that the term of the amplitude load energy A may include the fitting constant $w_{hc}$. By using the differential equation (9) simplified by excluding the terms other than the term of the amplitude load energy A in this way, the calculation load can be significantly reduced.

(b) Material Having Elastic Modulus B Having Anisotropy

In a case where an elastic modulus B of the material forming the structure D has anisotropy, the next differential equation (10) considering the anisotropy of the elastic modulus B can be used, for example.

[Math. 10]

$$\frac{1}{M}\frac{\partial \phi}{\partial t} = -\frac{\delta F_{sys}}{\delta \phi} - A \qquad (10)$$

In the differential equation (10), energy $F_{sys}$ of the system is expressed by the following equation (11).

[Math. 11]

$$F_{sys} = \int_V (f_{grad} + f_{elast}) dV \qquad (11)$$

In the equation (11), the gradient energy $f_{grad}$ is expressed by the following equation (12). In the equation (11), the elastic energy $f_{elast}$ is expressed by the following equation (13).

[Math. 12]

$$f_{grad} = \tfrac{1}{2}\kappa |\nabla \phi|^2 \qquad (12)$$

In the equation (12), $\kappa$ represents a material constant.

[Math. 13]

$$f_{elast} = \sum_{ijkl} B_{ijkl}\varepsilon_{ij}\varepsilon_{kl} \qquad (13)$$

In the equation (13), $\varepsilon$ represents a vertical strain.
In the equation (13), the anisotropy of the elastic modulus B can be appropriately reflected in a prediction result by treating an elastic modulus $B_{ijkl}$ as a tensor (matrix). Therefore, a crack to be generated in the structure D formed using the material having the elastic modulus B having anisotropy can be accurately predicted by calculating the differential equation (10).

Note that, in a case where the elastic modulus B of the material forming the structure D has isotropy, the elastic energy $f_{elast}$ can be expressed by the next equation (14) instead of by the equation (13).

[Math. 14]

$$f_{elast} = \frac{1}{2}\frac{B\nu}{(1+\nu)(1-2\nu)}(\varepsilon_{xx}+\varepsilon_{yy}+\varepsilon_{zz})^2 + \qquad (14)$$
$$\frac{1}{2}\frac{B\nu}{(1+\nu)}\left(\varepsilon_{xx}^2+\varepsilon_{yy}^2+\varepsilon_{zz}^2+\frac{1}{2}\gamma_{xy}^2+\frac{1}{2}\gamma_{yz}^2+\frac{1}{2}\gamma_{zx}^2\right)$$

In the equation (14), $\nu$ represents a Poisson's ratio and $\gamma$ represents a shear strain.

Figure 12:
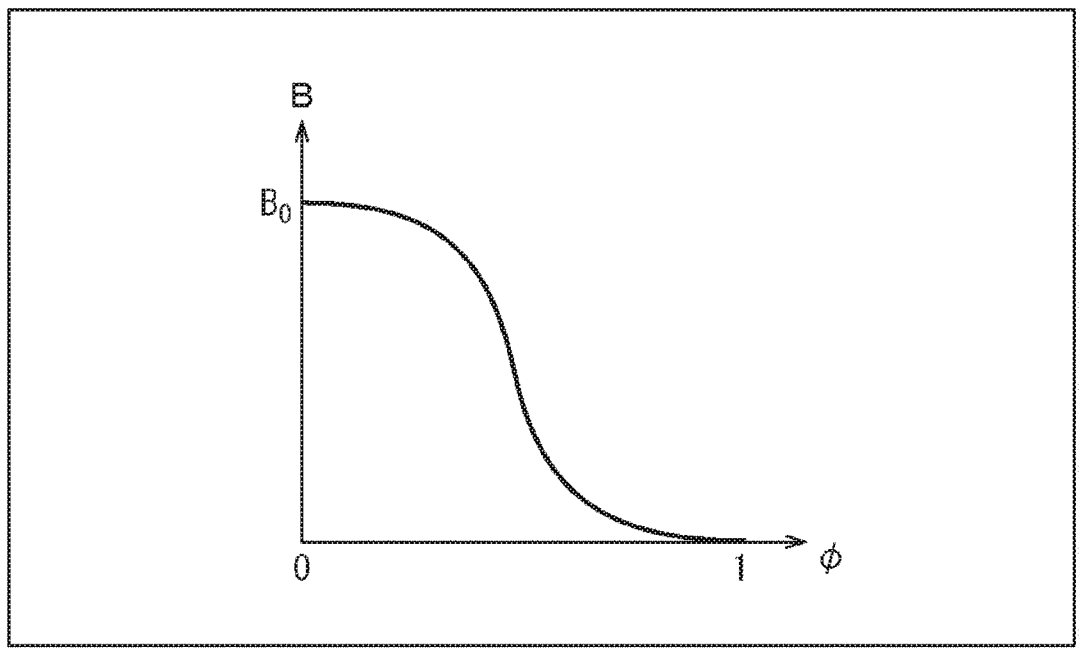
FIG. 12 is a diagram showing an example of a relationship between an elastic modulus and a crack variable.

Furthermore, the elastic modulus B in the equation (14) can be, for example, a function depending on the crack variable $\varphi$ as shown in FIG. 12. In the function shown in FIG. 12, the elastic modulus B becomes smaller as the crack variable $\varphi$ becomes larger. That is, the function shown in FIG. 12 can express that the elasticity of the material forming the structure D decreases with accumulation of the amplitude load energy A.

(c) Material Having Toughness Value Having Anisotropy

In the case where the toughness value of the material forming the structure D has anisotropy, the next differential equation (15) in which a coefficient of a diffusion term is a function of a gradient of the crack variable $\varphi$, that is, a function of an interface in a normal direction can be used, for example.

[Math. 15]

$$\frac{1}{M}\frac{\partial \phi}{\partial t} = -\frac{\partial F_{sys}}{\partial \phi} - A \qquad (15)$$

The energy $F_{sys}$ of the system in the differential equation (15) is expressed by the following equation (16).

[Math. 16]

$$F_{sys} = \int_V (f_{grad}+f_{elast})dV \qquad (16)$$

The gradient energy $f_{grad}$ in the equation (16) is expressed by the following equation (17). The elastic energy $f_{elast}$ in the equation (16) is expressed by the following equation (19).

[Math. 17]

$$f_{grad} = \tfrac{1}{2}\kappa |\nabla \phi|^2 \qquad (17)$$

K in the equation (17) represents a material constant, and is represented by the following equation (18).

[Math. 18]

$$\kappa = a(\nabla \phi/|\nabla \phi|) \qquad (18)$$

In the equation (18), a represents an anisotropy function.

[Math. 19]

$$f_{elast} = \frac{1}{2}\frac{Bv}{(1+v)(1-2v)}(\varepsilon_{xx}+\varepsilon_{yy}+\varepsilon_{zz})^2 + \frac{1}{2}\frac{B_v}{(1+v)}\left(\varepsilon_{xx}^2+\varepsilon_{yy}^2+\varepsilon_{zz}^2+\frac{1}{2}\gamma_{xy}^2+\frac{1}{2}\gamma_{yz}^2+\frac{1}{2}\gamma_{zx}^2\right) \quad (19)$$

In the equation (19), $v$ represents a Poisson's ratio and $\gamma$ represents a shear strain.

By using the equation (18), the diffusion coefficient can be changed according to the direction of the interface, and the tendency of the progress of a crack can be changed depending on a direction. Thereby, the anisotropy of the toughness value can be appropriately reflected in the prediction result. Therefore, a crack to be generated in the structure D formed using the material having the toughness value having anisotropy can be accurately predicted by calculating the differential equation (15).

(d) Material in Which Brittle Fracture and High-Cycle Fatigue Fracture Simultaneously Proceed In a case where the structure D is formed using a material in which the brittle fracture and the high-cycle fatigue fracture proceed at the same time, a crack by a combination of the brittle fracture and the high-cycle fatigue fracture occurs in the structure D. To predict the crack by a combination of the brittle fracture and the high-cycle fatigue fracture, the differential equation (20) can be used, for example.

[Math. 20]

$$\frac{1}{M}\frac{\partial \phi}{\partial t} = -\frac{\delta F_{sys}}{\delta \phi} - A \quad (20)$$

The energy $F_{sys}$ of the system in the differential equation (20) is expressed by the following equation (21).

[Math. 21]

$$F_{sys} = \int_V (f_{grad}+f_{elast})dV \quad (21)$$

The gradient energy $f_{grad}$ in the equation (21) is expressed by the following equation (22). The elastic energy $f_{elast}$ in the equation (21) is expressed by the following equation (23).

[Math. 22]

$$f_{grad} = \frac{1}{2}\kappa|\nabla\phi|^2 \quad (22)$$

In the equation (22), K represents a material constant.

[Math. 23]

$$f_{elast} = \frac{1}{2}\frac{Bv}{(1+v)(1-2v)}(\varepsilon_{xx}+\varepsilon_{yy}+\varepsilon_{zz})^2 + \frac{1}{2}\frac{B_v}{(1+v)}\left(\varepsilon_{xx}^2+\varepsilon_{yy}^2+\varepsilon_{zz}^2+\frac{1}{2}\gamma_{xy}^2+\frac{1}{2}\gamma_{yz}^2+\frac{1}{2}\gamma_{zx}^2\right) \quad (23)$$

In the equation (23), $v$ represents a Poisson's ratio, $\varepsilon$ represents a vertical strain, and $\gamma$ represents a shear strain.

By the differential equation (20), the brittle fracture can be analyzed by the release rate of the elastic energy $f_{elast}$ and the high-cycle fatigue fracture can be analyzed by the accumulation of the amplitude load energy A. Therefore, by calculating the differential equation (20), the crack by a combination of the brittle fracture and the high-cycle fatigue fracture to be generated in the structure D can be predicted.

2. Stabilization of Interface

To satisfactorily express a crack in the structure D, it is favorable to stabilize the interface between the element E0 having no cracks and the element E1 having a crack in the structure model $M_D$. That is, the crack variable $\varphi$ of the element E0 having no cracks is a value near "0", the crack variable of the element E1 having a crack is a value near "1", and the crack variable of any element E is favorably not to be an intermediate value between "0" and "1".

To stabilize the interface between the element E0 having no cracks and the element E1 having a crack in the structure model $M_D$, the following differential equation (24) can be used, for example.

[Math. 24]

$$\frac{1}{M}\frac{\partial \phi}{\partial t} = -\frac{\partial F_{sys}}{\partial \phi} - A \quad (24)$$

The energy $F_{sys}$ of the system in the differential equation (24) is expressed by the following equation (25).

[Math. 25]

$$F_{sys} = \int_V (f_{doub}+f_{elast})dV \quad (25)$$

In the equation (25), the barrier energy $f_{doub}$ is expressed by the following equation (26). In the equation (25), the elastic energy $f_{elast}$ is expressed by the following equation (27).

[Math. 26]

$$f_{grad} = \frac{1}{2}\kappa|\nabla\phi|^2 \quad (26)$$

In the equation (26), κ represents a material constant.

[Math. 27]

$$f_{doub} = e_{doub}\phi^2(1-\phi)^2 \quad (27)$$

$e_{doub}$ in the equation (27) represents an energy barrier.

Figure 13:
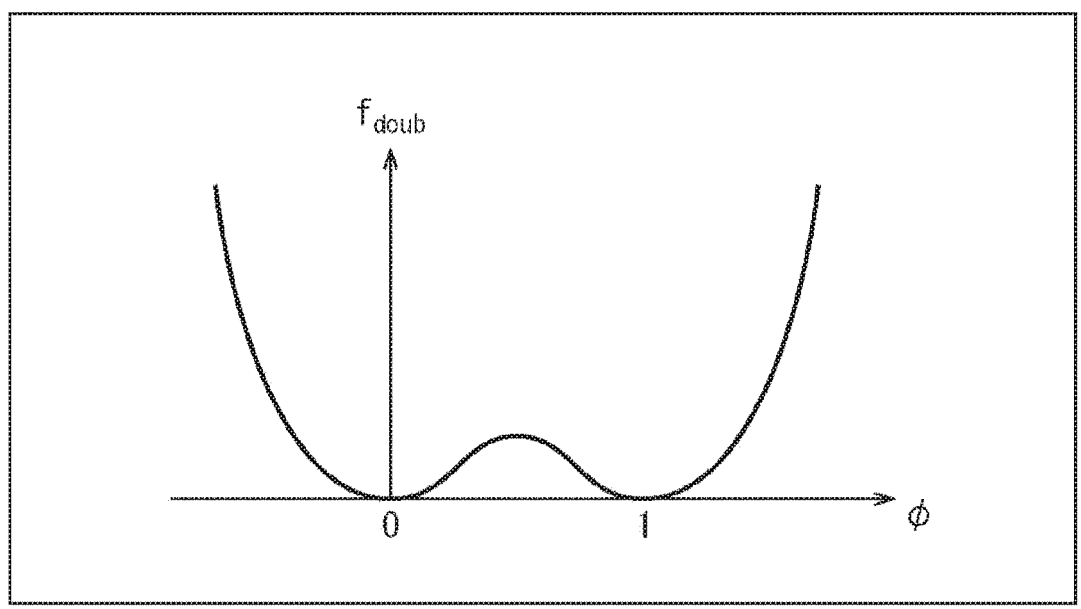
FIG. 13 is a diagram showing an example of a relationship between barrier energy and a crack variable.

The above-described equation (27) is a double well function as shown in FIG. 13. That is, the barrier energy $f_{doub}$ takes a minimum value at the crack variable $\varphi=0, 1$. For this reason, the crack variable $\varphi$ easily takes a value near "0" or "1" and less easily takes an intermediate value between "0" and "1". This stabilizes the interface between the element E0 having no cracks and the element E1 having a crack in the structure model $M_D$.

Furthermore, in the equation (27), the difficulty of generating a crack in the material forming the structure D can be expressed by the energy barrier $e_{doub}$. That is, the energy barrier $e_{doub}$ can be lowered in the case of a material that is easily cracked, and the energy barrier $e_{doub}$ can be increased in the case of a material that is less easily cracked.

As described above, according to the first embodiment of the present technology, a crack due to the high-cycle fatigue (elastic fatigue) among ductile fractures to be generated in the structure can be promptly predicted.

Note that, in the first embodiment, a case of considering only the low-load high-cycle fatigue (elastic fatigue) in the case of not considering a fatigue (low-cycle fatigue) not included in the high-load plastic strain, of the fatigue fractures to be generated in the structure, has been described. However, there is a case where not only the low-load high-cycle fatigue (elastic fatigue) but also the high-load plastic strain (low-cycle fatigue) needs to be considered as the fatigue fracture to be generated in the structure, depending on the material. This case will be described in a following second embodiment.

2. Second Embodiment

As a technology according to the second embodiment, a method capable of predicting a fatigue fracture to be generated in a structure including a low-load high-cycle fatigue (elastic fatigue) and a high-load low-cycle fatigue (plastic fatigue) will be described. Note that, hereinafter, description will be given focusing on a difference from the first embodiment.

In the second embodiment of the present technology, the next differential equation (28) obtained by introducing the term of the plastic dissipation energy $f_{plast}$ into the differential equation (4) is used.

[Math. 28]

$$\frac{1}{M}\frac{\partial \phi}{\partial t} = \nabla (\xi \nabla \phi) - \left( w_{doub} \frac{\partial f_{doub}}{\partial \phi} + w_{elast} \frac{\partial f_{elast}}{\partial \phi} + f_{plast} + A \right) \quad (28)$$

The differential equation (28) is an equation obtained by adding the term of plastic dissipation energy $f_{plast}$ to the differential equation (4). Furthermore, the differential equation (28) can be said to be an equation obtained by adding a term of the amplitude load energy A to the differential equation (3). In other words, the differential equation (28) is obtained by adding the terms of the plastic dissipation energy $f_{plast}$ for performing a low-cycle fatigue analysis and the amplitude load energy A for performing a high-cycle fatigue analysis corresponding to a repeated load to the differential equation (2). In the case of including both the low-load high-cycle fatigue (elastic fatigue) and the high-load plastic strain (low-cycle fatigue), a prediction is performed using this equation (28).

In the differential equation (28), the plastic dissipation energy $f_{plast}$ and the amplitude load energy A are not derivative terms unlike the elastic energy $f_{elast}$. This is because the elastic energy $f_{elast}$ is released over time while the plastic dissipation energy $f_{plast}$ and the amplitude load energy A are accumulated over time. In the differential equation (28), accumulation of the plastic dissipation energy $f_{plast}$ and the amplitude load energy A can be expressed by not using the plastic dissipation energy $f_{plast}$ and the amplitude load energy A as derivative terms.

Thus, the differential equation (28) includes the derivative term of the elastic energy $f_{elast}$ that expresses the release rate of the elastic energy $f_{elast}$, and the term of the plastic dissipation energy $f_{plast}$ that expresses the accumulation of the plastic dissipation energy $f_{plast}$, and the term of the amplitude load energy A that expresses the accumulation of the amplitude load energy A. Therefore, by calculating the differential equation (28), a crack can be predicted in consideration of both the brittle fracture and the fatigue fracture (including high and low-cycle fatigues).

For this reason, in the present technology, a crack to be generated in the structure D configured using a material that is easily subject to fatigue fracture including the low-cycle fatigue (plastic fatigue) and the high-cycle fatigue (elastic fatigue), such as a metal material or a resin material, can be accurately predicted. Furthermore, the crack prediction method according to the present technology is also capable of predicting a crack straddling an interface of a plurality of types of materials, similarly to the crack prediction method according to the concept of the phase field method. Therefore, the crack prediction method according to the present technology is capable of promptly predicting a crack to be generated in the structure D configured using a plurality of materials. Moreover, the crack prediction method according to the present technology has no restriction on the shape of the crack, similarly to the crack prediction method according to the concept of the phase field method. Therefore, high versatility can be obtained.

Details of Crack Prediction Device

Figure 14:
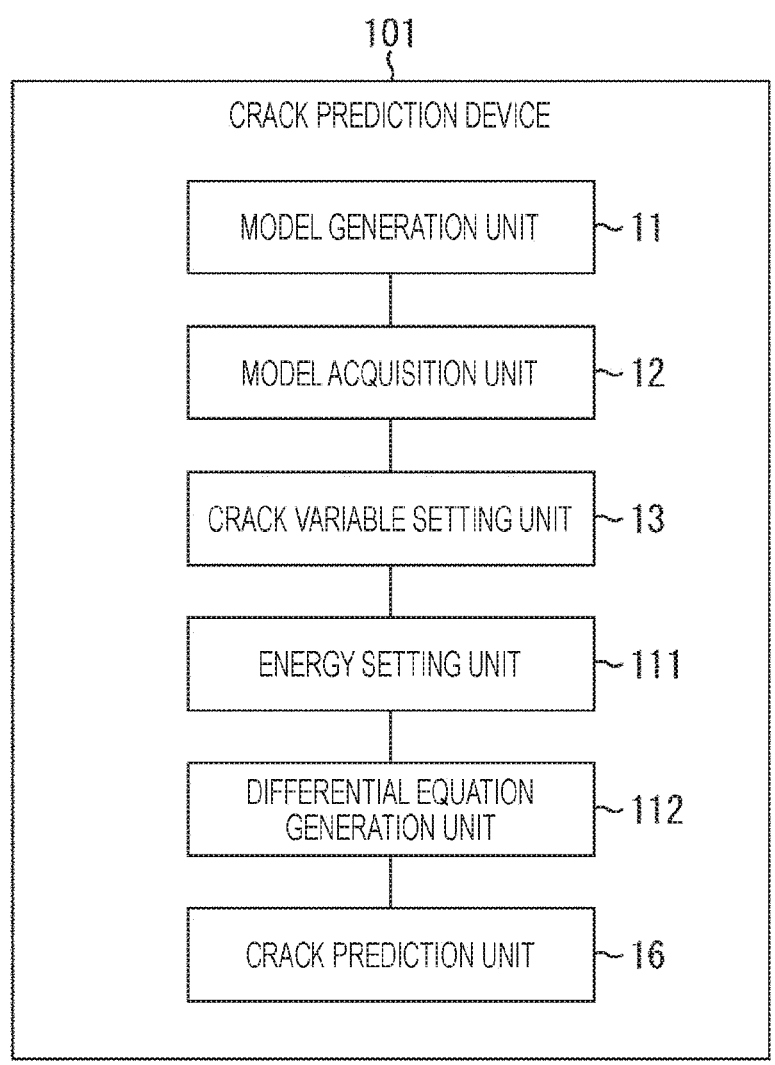
FIG. 14 is a block diagram showing a configuration example of a crack prediction device (information processing device) according to another embodiment of the present technology.

FIG. 14 is a block diagram showing a configuration example of a crack prediction device (information processing device) 101 according to the second embodiment of the present technology. The crack prediction device 101 includes a model generation unit 11, a model acquisition unit 12, a crack variable setting unit 13, an energy setting unit 111, a differential equation generation unit 112, and a crack prediction unit 16.

The crack prediction device 101 in FIG. 14 is different from the crack prediction device 10 in FIG. 1 in that the amplitude load energy setting unit 14 is replaced with the energy setting unit 111, and the differential equation generation unit 15 is replaced with the differential equation generation unit 112. The crack prediction device 101 in FIG. 14 is common to the crack prediction device 10 in FIG. 1 in including the model generation unit 11, the model acquisition unit 12, the crack variable setting unit 13, and the crack prediction unit 16.

In other words, the energy setting unit 111 sets the amplitude load energy A and the plastic dissipation energy $f_{plast}$ to each element E of a structure model $M_D$.

The differential equation generation unit 112 creates a differential equation using the crack variable φ set by the crack variable setting unit 13, the amplitude load energy A set by the energy setting unit 111, and the plastic dissipation energy $f_{plast}$ set by the energy setting unit 111.

Therefore, the crack prediction unit 16 in FIG. 14 predicts a crack to be generated in the structure D by calculating the differential equation generated by the differential equation generation unit 112.

Example of Crack Prediction Operation

Figure 15:
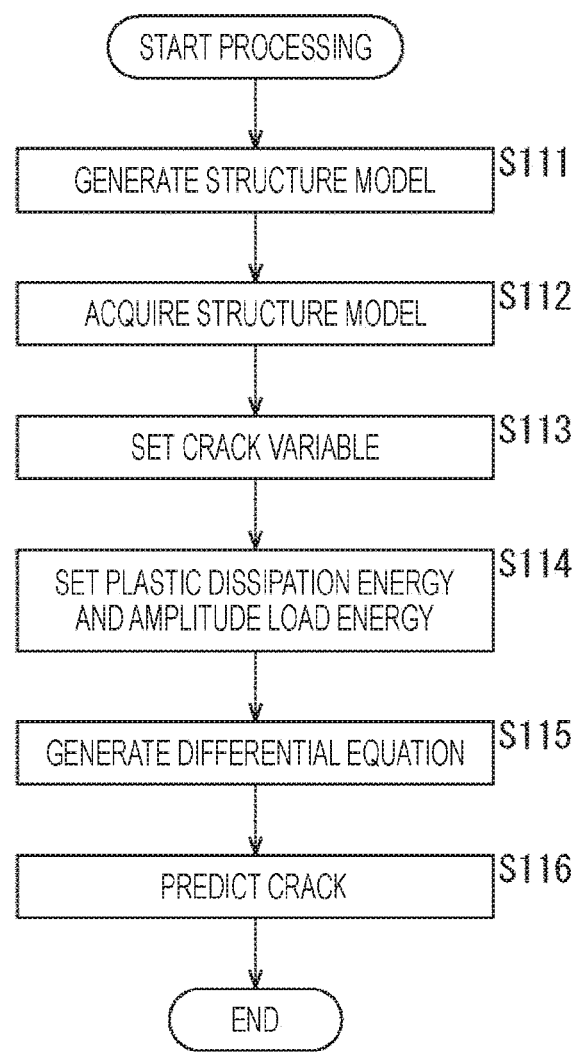
FIG. 15 is a flowchart illustrating crack prediction processing of the crack prediction device in FIG. 14.

FIG. 15 is a flowchart illustrating crack prediction processing of the crack prediction device 101 in FIG. 14. Hereinafter, the crack prediction processing according to the second embodiment will be described along the flow in FIG. 15. Note that steps S111 to S113 and S116 in FIG. 15 basically perform similar processing to steps S11 to S13 and S16 in FIG. 2, and thus detailed description thereof will not be repeated.

Model Generation Step

In step S111, the model generation unit 11 generates the model (structure model) $M_D$ that reproduces a configuration of the structure D.

Model Acquisition Step

In step S112, the model acquisition unit 12 acquires the structure model $M_D$ generated in step S111.

Crack Variable Setting Step

In step S113, the crack variable setting unit 13 sets the crack variable φ expressing the presence or absence of a crack in each element E of the structure model $M_D$ acquired in step S112.

Amplitude Load Energy Setting Step

In step S114, the energy setting unit 111 sets the plastic dissipation energy $f_{plast}$ and the amplitude load energy A to each element E of the structure model $M_D$ acquired in step S112. Note that, here, only setting of the plastic dissipation energy $f_{plast}$, which is a difference from step S14 in FIG. 2, will be described.

In other words, an element E1 already having a crack, plastic deformation does not occur. Therefore, the plastic dissipation energy $f_{plast}$ is not accumulated. For this reason, the plastic dissipation energy $f_{plast}$ of the element E1 is set to "0".

The plastic dissipation energy $f_{plast}$ in an element E0 having no cracks is set on the basis of a relationship between an equivalent stress σ and an equivalent plastic strain $\varepsilon_p$ experimentally obtained according to a material constituting the element E0. Since the equivalent plastic strain $\varepsilon_p$ depends on the crack variable φ, the plastic dissipation energy $f_{plast}$ is expressed as a function of the crack variable φ.

Figure 16A:
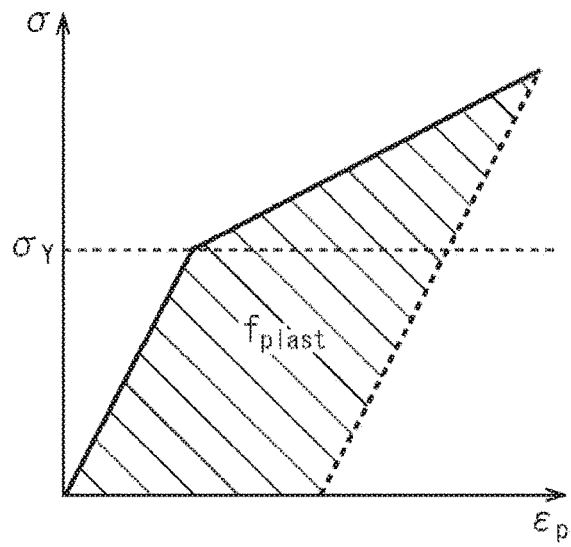
FIGS. 16A and 16B are diagrams showing an example of a method of expressing plastic dissipation energy set in the crack prediction processing.
Figure 16B:
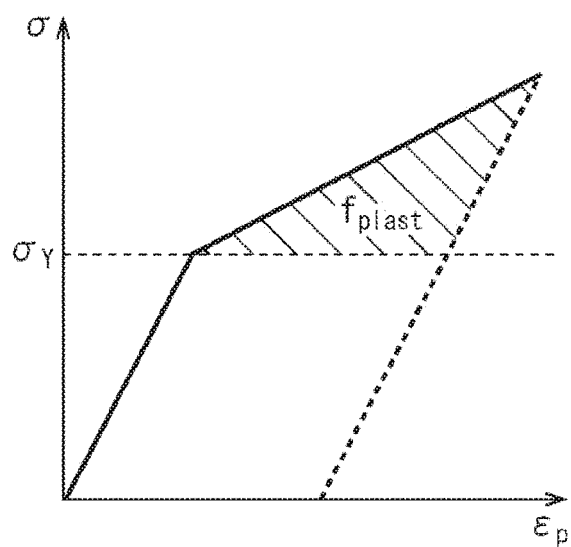

FIGS. 16A and 16B are diagrams showing an example of a method of expressing the plastic dissipation energy $f_{plast}$ set in the element E0 in step S114. FIGS. 16A and 16B show an example of an equivalent stress-equivalent plastic strain diagram obtained from the material forming the structure D. In FIGS. 16A and 16B, the vertical axis represents the equivalent stress σ, and the horizontal axis represents the equivalent plastic strain $\varepsilon_p$. Furthermore, FIGS. 16A and 16B show a yield stress $\sigma_Y$.

The material from which the equivalent stress-equivalent plastic strain diagram shown in FIGS. 16A and 16B are obtained is elastically deformed in a region where the equivalent stress σ is less than the yield stress $\sigma_Y$ and is plastically deformed in a region where the equivalent stress σ is equal to or larger than the yield stress $\sigma_Y$. The plastic dissipative energy $f_{plast}$ expresses energy mainly dissipated as thermal energy due to plastic deformation of the material when the equivalent stress σ is equal to or larger than the yield stress $\sigma_Y$.

The plastic dissipation energy $f_{plast}$ can be defined as, for example, areas of hatched regions in FIG. 16A and FIG. 16B. The area of the hatched region in FIG. 16A can be calculated by, for example, the next expression (29), using an amount obtained by integrating the equivalent stress σ by a minute increment of the equivalent plastic strain $\varepsilon_p$.

[Math. 29]

$$f_{plast} = \int \sigma d\varepsilon_p \quad (29)$$

Furthermore, the area of the hatched region in FIG. 16B can be calculated by, for example, the next equation (30), using a product of the equivalent plastic strain εp and a difference between the equivalent stress a and the yield stress $\sigma_Y$.

[Math. 30]

$$f_{plast} = \frac{1}{2}(\sigma - \sigma_y)\varepsilon_p \quad (30)$$

Note that, in the equation (30), the plastic dissipation energy $f_{plast}$ in a case where the equivalent stress σ is smaller than the yield stress $\sigma_y$ is set as zero.

The expression method of the plastic dissipation energy $f_{plast}$ can be used properly so that a crack can be accurately predicted according to the material forming the structure D, a physical phenomenon, or the like. Note that the function expressing the plastic dissipation energy $f_{plast}$ is not limited to the equations (29) and (30), and can be appropriately created on the basis of the relationship between the equivalent stress σ and the equivalent plastic strain $\varepsilon_p$.

Note that step S114 may be omitted, for example, in a case where the amplitude load energy A and the plastic dissipation energy $f_{plast}$ are set in advance in the structure model $M_D$.

Differential Equation Generation Step

In step S115, the differential equation generation unit 112 creates a differential equation using the crack variable φ set in step S113, the amplitude load energy A set in step S114, and the plastic dissipation energy $f_{plast}$ set in step S114.

An example of the differential equation generated in step S115 includes the above-described differential equation (28). Furthermore, in step S115, the following differential equation (31) may be generated, which is an improvement of the differential equation (28). Note that the equation (31) is also a diffusion equation.

[Math. 31]

$$\frac{1}{M}\frac{\partial \phi}{\partial t} = \nabla(\xi \nabla \phi) - \left(w_{doub}\frac{\partial f_{doub}}{\partial \phi} + w_{elast}\frac{\partial f_{elast}}{\partial \phi} + w_{plast}f_{plast} + w_{hc}A\right) \quad (31)$$

In the differential equation (31), a fitting constant $w_{doub}$ for the derivative term of the barrier energy $f_{doub}$, a fitting constant $w_{elast}$ for the derivative term of the elastic energy $f_{elast}$, a fitting constant $w_{plast}$ for the term of the plastic dissipation energy $f_{plast}$, and a fitting constant $w_{hc}$ for the term of the amplitude load energy A are introduced. Thereby, weighting of the derivative term of the barrier energy $f_{doub}$, the derivative term of the elastic energy $f_{elast}$, the term of the plastic dissipation energy $f_{plast}$, and the term of the amplitude load energy A can be optimized according to the configuration of the structure D, and the like. Thereby, a crack to be generated in the structure D can be further accurately predicted.

Here, the modification of the differential equation described for the amplitude load energy A in the first embodiment, for example, the equation (9), the equation (10), the equation (15), the equation (20), the equation (24), and the like are similarly applied by replacing the amplitude load energy A with the plastic dissipation energy $f_{plast}$.

Note that step S115 may be omitted, for example, in a case where a differential equation is generated in advance.

Crack Prediction Step

In step S116, the crack prediction unit 16 predicts a crack to be generated in the structure D by calculating the differential equation generated in step S115. Note that, in a case where step S115 is not performed, a crack to be generated in the structure D is predicted by calculating the differential equation acquired from an external device or the like in step S116.

As described above, according to the second embodiment of the present technology, a crack due to fatigue fractures (low-cycle fatigue (plastic fatigue) and high-cycle fatigue (elastic fatigue)) to be generated in the structure can be promptly predicted.

In other words, according to the second embodiment of the present technology, all of crack phenomena, such as a brittle crack, a crack due to the low-cycle fatigue (plastic fatigue), and a crack due to a high-cycle repeated fatigue, can be analyzed all at once. In other words, according to the present technology, a crack to be generated in the structure D can be promptly and more accurately predicted.

Other Embodiments

Although the embodiments of the present technology have been described above, the present technology is not limited to the above-described embodiments. Various modifications can be added to any of the embodiments without departing from the gist of the present technology.

For example, in the above embodiments, the element E of the structure model $M_D$ has been a primary element. However, the element E of the structure model $M_D$ may be a secondary element as necessary. In this case, distribution of crack variables $\varphi$ in each element E of the structure model $M_D$ can be considered. Therefore, a crack in the structure D can be more accurately predicted.

As described above, according to the present technology, an equation obtained by time-developing the crack variable $\varphi$ of the field expressing the presence or absence of a crack by a diffusion equation with a term proportional to the amplitude load energy as a source term has been numerically solved.

Thereby, the high-cycle fatigue fracture in the metal/resin elastic region can be predicted while taking the advantages of the phase field method that is capable of coping with a crack straddling an interface and allowing the crack shape to be freely varied.

Moreover, according to the present technology, an equation obtained by time-developing the crack variable $\varphi$ of the field expressing the presence or absence of a crack by a diffusion equation with a term proportional to the plastic dissipation energy and a term of the crack variable $\varphi$ of the field expressing the presence or absence of a crack as source terms has been numerically solved.

Thereby, the low-cycle repeated fatigue fracture in the metal/resin plastic region and the high-cycle fatigue fracture in the elastic region can be predicted while taking the advantages of the phase field method capable of coping with a crack straddling an interface and allowing the crack shape to be freely varied. Thereby, a crack can be more accurately predicted.

3. Computer

The above-described series of processing can be executed by hardware or by software. In the case of executing the series of processing by software, a program that configures the software is installed in a computer. Here, the computer includes a computer incorporated in dedicated hardware, a computer, for example, general-purpose personal computer, capable of executing various functions by installing various programs, and the like.

Figure 17:
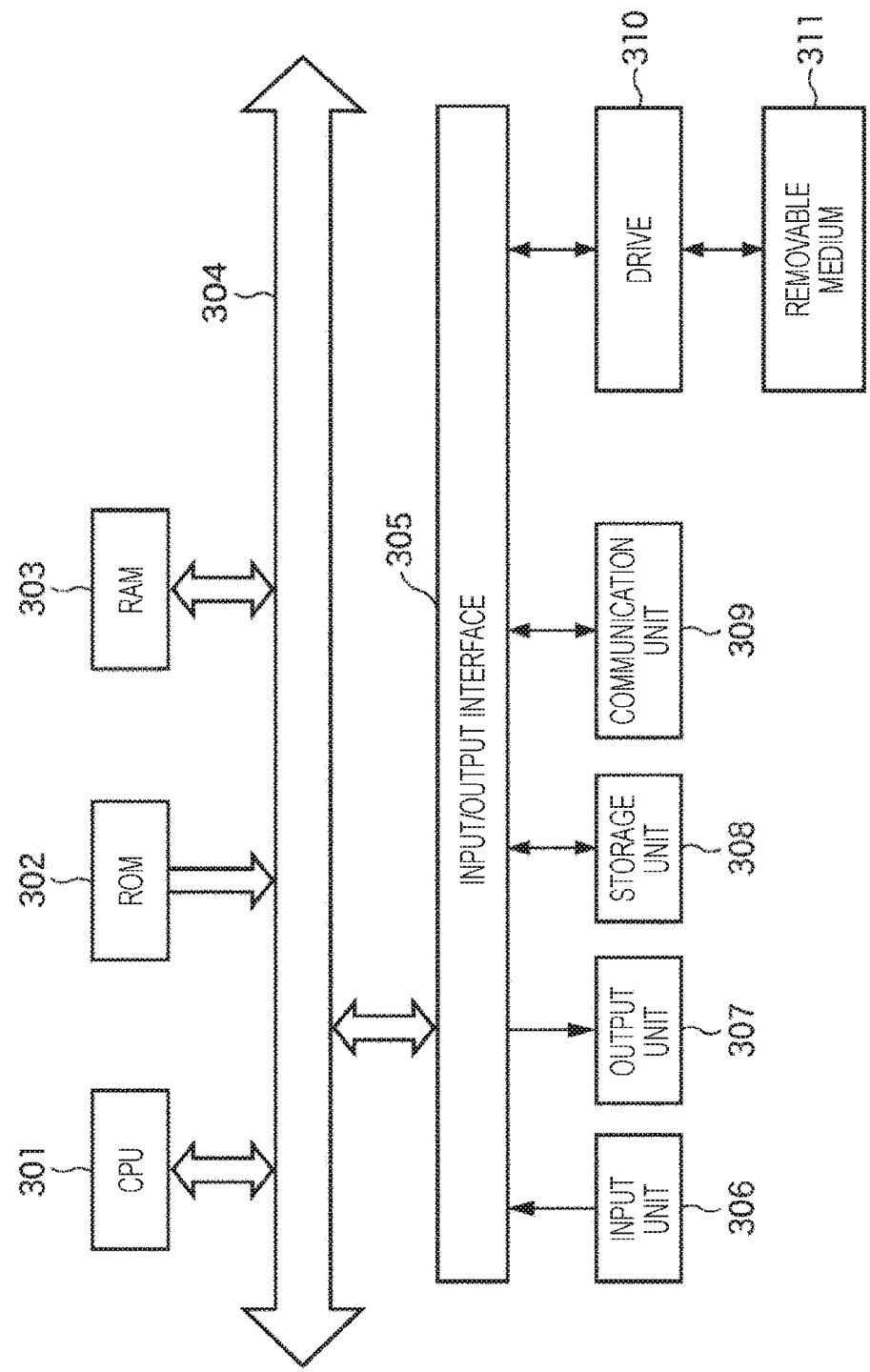
FIG. 17 is a block diagram showing a configuration example of a computer.

FIG. 17 is a block diagram showing a configuration example of hardware of a computer that executes the above-described series of processing by a program.

In the computer shown in FIG. 17, a central processing unit (CPU) 301, a read only memory (ROM) 302, and a random access memory (RAM) 303 are mutually connected by a bus 304.

An input/output interface 305 is also connected to the bus 304. An input unit 306, an output unit 307, a storage unit 308, a communication unit 309, and a drive 310 are connected to the input/output interface 305.

The input unit 306 includes, for example, a keyboard, a mouse, a microphone, a touch panel, an input terminal, and the like. The output unit 307 includes, for example, a display, a speaker, an output terminal, and the like. The storage unit 308 includes, for example, a hard disk, a RAM disk, a nonvolatile memory, and the like. The communication unit 309 includes, for example, a network interface. The drive 310 drives a removable medium 311 such as a magnetic disk, an optical disk, a magneto-optical disk, or a semiconductor memory.

In the computer configured as described above, the program is loaded to the RAM 303 and executed via the CPU 301 and the bus 304, so that the above-described series of processing is performed. Furthermore, the RAM 303 appropriately stores data and the like necessary for the CPU 301 to execute the various types of processing.

The program executed by the computer (CPU 301) can be recorded on the removable medium 311 as a package medium or the like, for example, and applied. In that case, the program can be installed to the storage unit 308 via the input/output interface 305 by attaching the removable medium 311 to the drive 310.

Furthermore, this program can be provided via a wired or wireless transmission medium such as a local area network, the Internet, or digital broadcast. In that case, the program can be received by the communication unit 309 and installed in the storage unit 308.

Other than the above method, the program can be installed in the ROM 302 or the storage unit 308 in advance.

Furthermore, embodiments of the present technology are not limited to the above-described embodiments, and various modifications can be made without departing from the gist of the present technology.

Note that, in the above description, the configuration described as one device (or processing unit) may be divided into and configured as a plurality of devices (or processing units). On the contrary, the configuration described a plurality of devices (or processing units) may be collectively configured as one device (or processing unit). Furthermore, a configuration other than the above-described configuration may be added to the configuration of each device (or each processing unit). Moreover, a part of the configuration of a certain device (or processing unit) may be included in the configuration of another device (or another processing unit) as long as the configuration and operation of the entire system are substantially the same. That is, the present technology is not limited to the above-described embodiments, and various modifications can be made without departing from the gist of the present technology.

The preferred embodiments of the present disclosure have been described in detail with reference to the accompanying drawings, but the present disclosure is not limited to such examples. It is obvious that persons having ordinary knowledge in the technical field to which the present disclosure belongs can conceive various modifications or alterations within the scope of the technical idea described in the claims, and it is naturally understood that the modifications and alterations belong to the technical scope of the present disclosure.

Note that the present technology can also have the following configurations.

(1) An information processing device including:
a model acquisition unit configured to acquire a structure model corresponding to a predetermined structure; and
a crack prediction unit configured to predict a crack to be generated in the structure by calculating a differential equation including a term proportional to a time derivative of a crack variable set to each position of the structure model and expressing presence or absence of a crack, and a term proportional to amplitude load energy set to each position of the structure model and expressing energy applied during a repeated load using the crack variable.

(2) The information processing device according to (1), in which
the amplitude load energy is set by integrating a difference between a maximum value and a minimum value of a stress during the repeated load and a difference between a maximum value and a minimum value of a strain.

(3) The information processing device according to (1) or (2), in which
a constant regarding the amplitude load energy is set as a value according to a slope of a characteristic line of a high-cycle fatigue region in an S-N diagram of a corresponding material.

(4) The information processing device according to (1) or (2), in which
a constant regarding the amplitude load energy is set as a value according to a slope of a characteristic line of a high-cycle fatigue separation region in an S-N diagram of a corresponding material interface.

(5) The information processing device according to any one of (1) to (4), in which
the crack prediction unit divides an analysis section for each inflection point of stress time change with respect to a non-cyclic repeated load, and predicts the crack to be generated in the structure for each divided analysis section.

(6) The information processing device according to any one of (1) to (5), in which
the crack prediction unit predicts the crack to be generated in the structure by calculating the differential equation further including a term proportional to plastic dissipation energy set to each position of the structure model and expressing energy dissipated during plastic deformation using the crack variable.

(7) The information processing device according to (6), in which
the plastic dissipation energy is set using an amount obtained by integrating an equivalent stress by a minute increment of an equivalent plastic strain.

(8) The information processing device according to (6) or (7), in which
the plastic dissipation energy is set using a product of an equivalent plastic strain and a difference between an equivalent stress and an yield stress, and is set as zero in a case where the equivalent stress is smaller than the yield stress.

(9) The information processing device according to any one of (6) to (8), in which
the differential equation further includes a diffusion term proportional to a second derivative of a spatial coordinate.

(10) An information processing method including:
acquiring a structure model corresponding to a predetermined structure; and
predicting a crack to be generated in the structure by calculating a differential equation including a term proportional to a time derivative of a crack variable set to each position of the structure model and expressing presence or absence of a crack, and a term proportional to amplitude load energy set to each position of the structure model and expressing energy applied during a repeated load using the crack variable.

(11) A program for causing a computer to function as:
a model acquisition unit configured to acquire a structure model corresponding to a predetermined structure; and
a crack prediction unit configured to predict a crack to be generated in the structure by calculating a differential equation including a term proportional to a time derivative of a crack variable set to each position of the structure model and expressing presence or absence of a crack, and a term proportional to amplitude load energy set to each position of the structure model and expressing energy applied during a repeated load using the crack variable.

REFERENCE SIGNS LIST

10 Crack prediction device (information processing device)
11 Model generation unit
12 Model acquisition unit
13 Crack variable setting unit
14 Amplitude load energy setting unit
15 Differential equation generation unit
16 Crack prediction unit
110 Crack prediction device
111 Energy setting unit
112 Differential equation generation unit
$M_D$ Structure model
E, E0, E1 Element

The invention claimed is:

1. An information processing device comprising:
a model acquisition unit configured to acquire a structure model corresponding to a predetermined structure; and
a crack prediction unit configured to predict a crack to be generated in the predetermined structure by calculating a differential equation including a term proportional to a time derivative of a crack variable set to each position of the structure model and expressing presence or absence of a crack, and a term proportional to amplitude load energy set to each position of the structure model and expressing energy applied during a repeated load using the crack variable.

2. The information processing device according to claim 1, wherein
the amplitude load energy is set by integrating a difference between a maximum value and a minimum value of a stress during the repeated load and a difference between a maximum value and a minimum value of a strain.

3. The information processing device according to claim 1, wherein
a constant regarding the amplitude load energy is set as a value according to a slope of a characteristic line of a high-cycle fatigue region in an S-N diagram of a corresponding material.

4. The information processing device according to claim 1, wherein
a constant regarding the amplitude load energy is set as a value according to a slope of a characteristic line of a high-cycle fatigue separation region in an S-N diagram of a corresponding material interface.

5. The information processing device according to claim 1, wherein
the crack prediction unit divides an analysis section for each inflection point of stress time change with respect to a non-cyclic repeated load, and predicts the crack to be generated in the predetermined structure for each divided analysis section.

6. The information processing device according to claim 1, wherein
the crack prediction unit predicts the crack to be generated in the predetermined structure by calculating the differential equation further including a term proportional to plastic dissipation energy set to each position of the structure model and expressing energy dissipated during plastic deformation using the crack variable.

7. The information processing device according to claim 6, wherein
the plastic dissipation energy is set using an amount obtained by integrating an equivalent stress by a minute increment of an equivalent plastic strain.

8. The information processing device according to claim 6, wherein
the plastic dissipation energy is set using a product of an equivalent plastic strain and a difference between an equivalent stress and a yield stress, and is set as zero in a case where the equivalent stress is smaller than the yield stress.

9. The information processing device according to claim 1, wherein
the differential equation further includes a diffusion term proportional to a second derivative of a spatial coordinate.

10. An information processing method comprising:
acquiring a structure model corresponding to a predetermined structure; and
predicting a crack to be generated in the predetermined structure by calculating a differential equation including a term proportional to a time derivative of a crack variable set to each position of the structure model and expressing presence or absence of a crack, and a term proportional to amplitude load energy set to each position of the structure model and expressing energy applied during a repeated load using the crack variable.

11. A program for causing a computer to function as:
a model acquisition unit configured to acquire a structure model corresponding to a predetermined structure; and
a crack prediction unit configured to predict a crack to be generated in the predetermined structure by calculating a differential equation including a term proportional to a time derivative of a crack variable set to each position of the structure model and expressing presence or absence of a crack, and a term proportional to amplitude load energy set to each position of the structure model and expressing energy applied during a repeated load using the crack variable.

* * * * *